(12) United States Patent
Oikawa

(10) Patent No.: US 7,665,912 B2
(45) Date of Patent: Feb. 23, 2010

(54) IMAGE-TAKING APPARATUS AND CONTROL METHOD THEREOF

(75) Inventor: Makoto Oikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 541 days.

(21) Appl. No.: 11/444,094

(22) Filed: May 31, 2006

(65) Prior Publication Data

US 2006/0275026 A1    Dec. 7, 2006

(30) Foreign Application Priority Data

Jun. 3, 2005    (JP) ............................. 2005-163527

(51) Int. Cl.
*G03B 19/12* (2006.01)
(52) U.S. Cl. ..................... 396/358; 348/341; 348/344
(58) Field of Classification Search ................ 396/111, 396/358; 348/341, 344
See application file for complete search history.

(56) References Cited

U.S. PATENT DOCUMENTS

| | | | |
|---|---|---|---|
| 2001/0019362 A1* | 9/2001 | Nakamura et al. | 348/222 |
| 2003/0050533 A1* | 3/2003 | Minami | 600/168 |
| 2004/0155976 A1* | 8/2004 | Suda | 348/345 |
| 2005/0219401 A1* | 10/2005 | Oikawa | 348/345 |

* cited by examiner

*Primary Examiner*—Melissa J Koval
*Assistant Examiner*—Fang-Chi Chang
(74) *Attorney, Agent, or Firm*—Cowan, Liebowitz & Latman, P.C.

(57) ABSTRACT

An image-taking apparatus is disclosed which comprises an image-pickup device, an image processing unit, a display unit, a focus detection unit which detects a focus state of the image-taking lens, and an optical path splitting unit which is switchable between a first state in which it is disposed in an optical path from the image-taking lens and a second state in which it is retracted from the optical path. The optical path splitting unit transmits part of the light from the image-taking lens toward the image-pickup device and reflects the remaining part of the light toward the focus detection unit in the first state. A control unit performs focus control based on the detection result of the focus detection unit. The control unit performs the focus control in the first state such that an image-forming position matches a light-receiving surface of the image-pickup device in the second state.

9 Claims, 14 Drawing Sheets

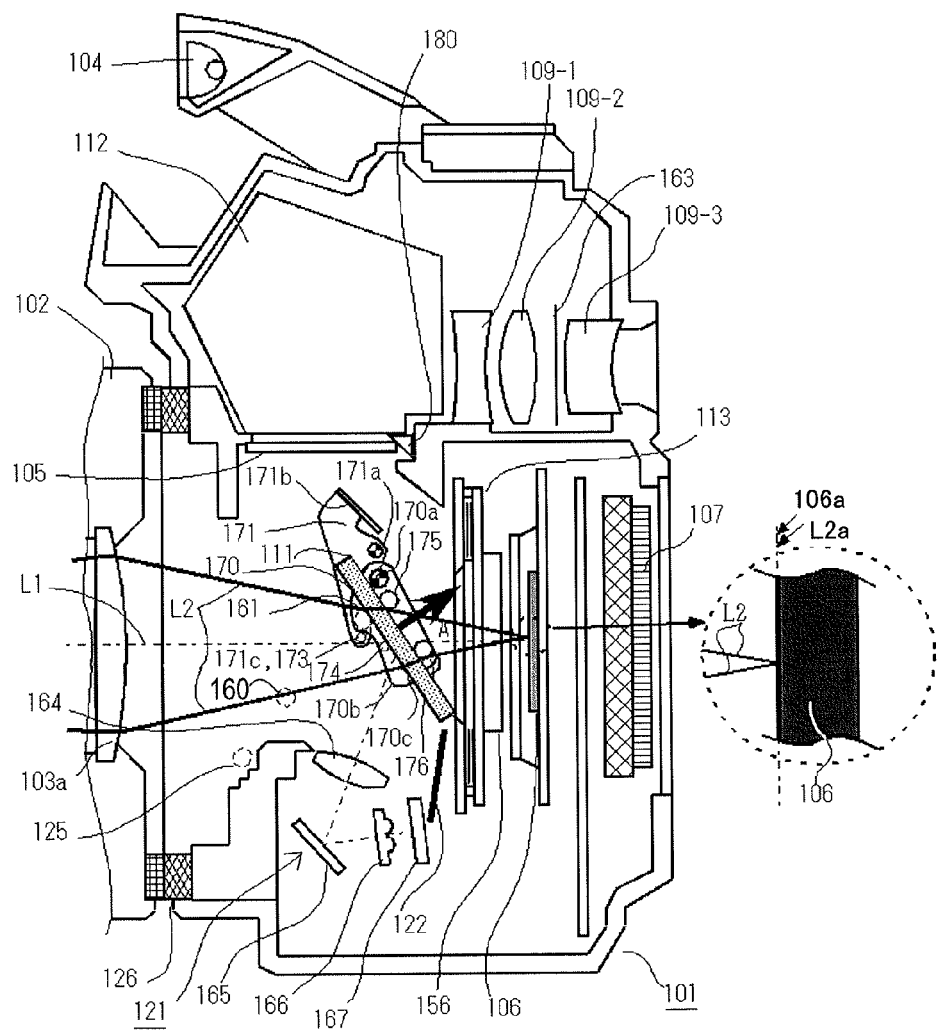
FIG. 13 *(PRIOR ART)*

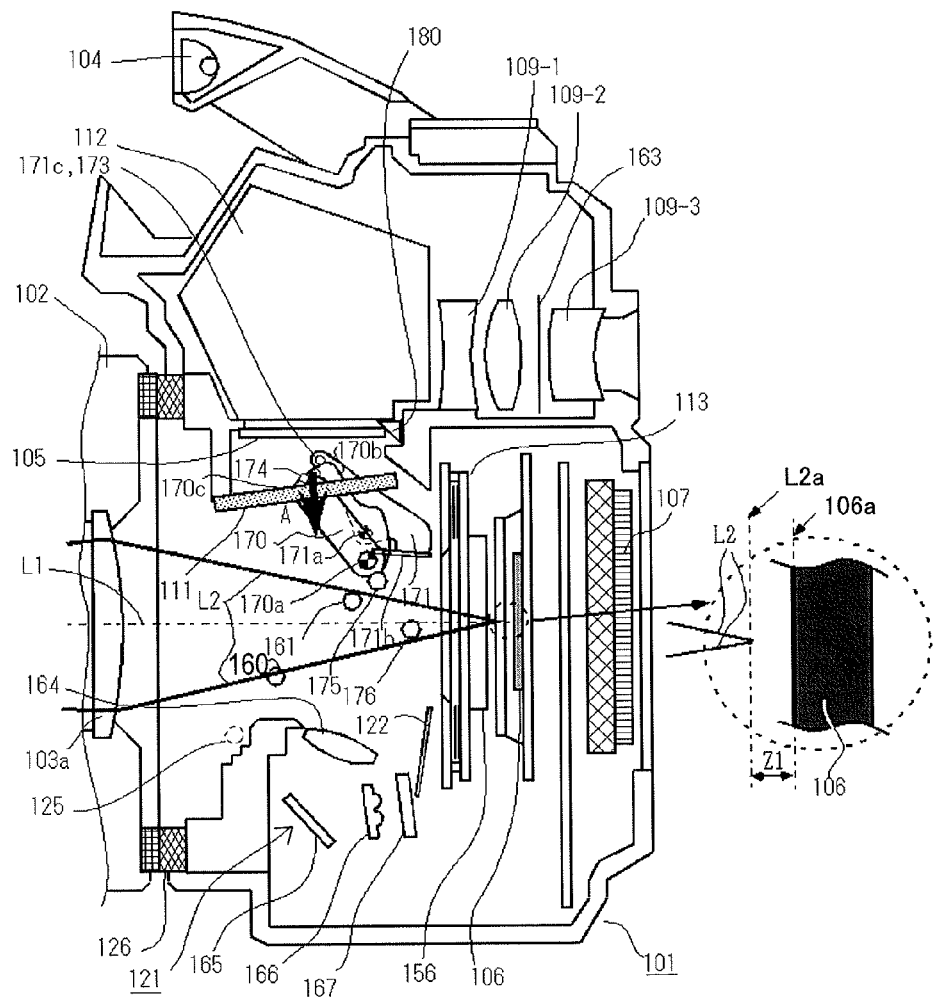
FIG. 14 *(PRIOR ART)*

IMAGE-TAKING APPARATUS AND CONTROL METHOD THEREOF

BACKGROUND OF THE INVENTION

The present invention relates to an image-taking apparatus which allows image taking while a user observes an object image taken by an image-pickup device and displayed on a monitor, and a control method of the image-taking apparatus.

In an image-taking apparatus such as a single-lens reflex digital camera, part of light from an image-taking lens is reflected by a main mirror (an optical path splitting system) formed of a half mirror and is directed to a viewfinder optical system to allow a user to optically observe a subject (an object). The remaining light transmitted through the half mirror is then reflected by a sub mirror disposed at the back of the half mirror and is directed to a focus detection unit. The focus detection unit detects the focus state of the image-taking lens with a focus detection method such as a phase difference detection method. Based on the detection result, auto-focus (AF) operation is performed for driving a focus lens to an in-focus position.

In another proposed camera, in addition to or instead of the object observation through a viewfinder optical system, light transmitted through a half mirror is then directed to an image-pickup device to display an object image with an electronic viewfinder, while the remaining light reflected by the half mirror is then directed to a focus detection unit to perform AF operation (see Japanese Patent Laid-Open No. 2002-6208 and Japanese Patent Laid-Open No. 2004-264832). In such a camera, the half mirror is retracted from an image-taking optical path when a particularly high-definition still image is taken for recording.

When an object image is displayed with the electronic viewfinder (hereinafter referred to as "during the use of the electronic viewfinder"), the half mirror is put in the image-taking optical path and the optical path length is changed by the thickness of the half mirror as compared with the case where the half mirror is retracted from the image-taking optical path. Thus, the camera may not be focused on the image-pickup device through auto-focus operation based on the focus detection result when the half mirror is put in the image-taking optical path (during the use of the electronic viewfinder). In other words, a blurred image may be displayed in the electronic viewfinder.

To address this, in each of image-taking apparatuses disclosed in Japanese Patent Laid-Open No. 2002-6208 and Japanese Patent Laid-Open No. 2004-264832, the focus detection result is corrected by an amount corresponding to a change in optical path length due to the placement of the half mirror to achieve focus on the image-pickup device during the use of the electronic viewfinder.

In the image-taking apparat uses disclosed in Japanese Patent Laid-Open No. 2002-6208and Japanese Patent Laid-Open No. 2004-264832 in which auto-focus operation is performed to focus the camera on the image-pickup device during the use of the electronic viewfinder, conversely, the camera is not focused on the image-pickup device during image taking when the half mirror is retracted from the image-taking optical path. It is thus necessary to correct focus again by an amount corresponding to a change in optical path length due to the retraction of the half mirror during the image taking.

Focus correction is performed by driving a focusing lens of an image-taking lens. Particularly, in an image-taking lens such as a wide-angle image-taking lens which changes slightly its focus state relative to a moving amount of a focusing lens, the focus correction requires a large amount of driving of the focusing lens. In this case, there is a problem of a long time taken to make the transition from the operation of the electronic viewfinder to the ready state of image-taking operation, that is, a large time lag.

BRIEF SUMMARY OF THE INVENTION

It is an object of the present invention to provide an image-taking apparatus which involves no problem of defocus both when an optical path splitting system is disposed in an image-taking optical path during the use of an electronic viewfinder and when the optical path splitting system is retracted from the image-taking optical path, and which allows a reduced time lag in starting image taking after the operation of the electronic viewfinder.

According to an aspect, the present invention provides an image-taking apparatus having an image-pickup device which photoelectrically converts an object image formed by an image-taking lens, an image processing unit which performs image processing on a signal from the image-pickup device to produce an image, a display unit which displays the produced image, a focus detection unit which detects a focus state of the image-taking lens by using light from the image-taking lens, an optical path splitting unit which is switchable between a first state in which the optical path splitting unit is disposed in an optical path from the image-taking lens to the image-pickup device and a second state in which the optical path splitting unit is retracted from the optical path, the optical path splitting unit transmitting part of the light from the image-taking lens toward the image-pickup device and reflecting the remaining part of the light toward the focus detection unit in the first state, and a control unit which performs focus control of the image-taking lens based on the detection result of the focus detection unit. The control unit, in the first state of the optical path splitting unit, performs the focus control such that an image-forming position of the light by the image-taking lens matches a light-receiving surface of the image-pickup device in the second state of the optical path splitting unit.

Other objects and features of the present invention will become apparent from the following description and the attached drawings.

BRIEF DESCRIPTION OF THE DRAWINGS

FIG. 13 is a section view of a conventional image-taking apparatus (in a second optical path state).

FIG. 14 is a section view of the conventional image-taking apparatus (in a third optical path state).

DETAILED DESCRIPTION OF THE PREFERRED EMBODIMENTS

Preferred embodiments of the present invention will hereinafter be described with reference to the drawings.

Embodiment 1

Figure 4:
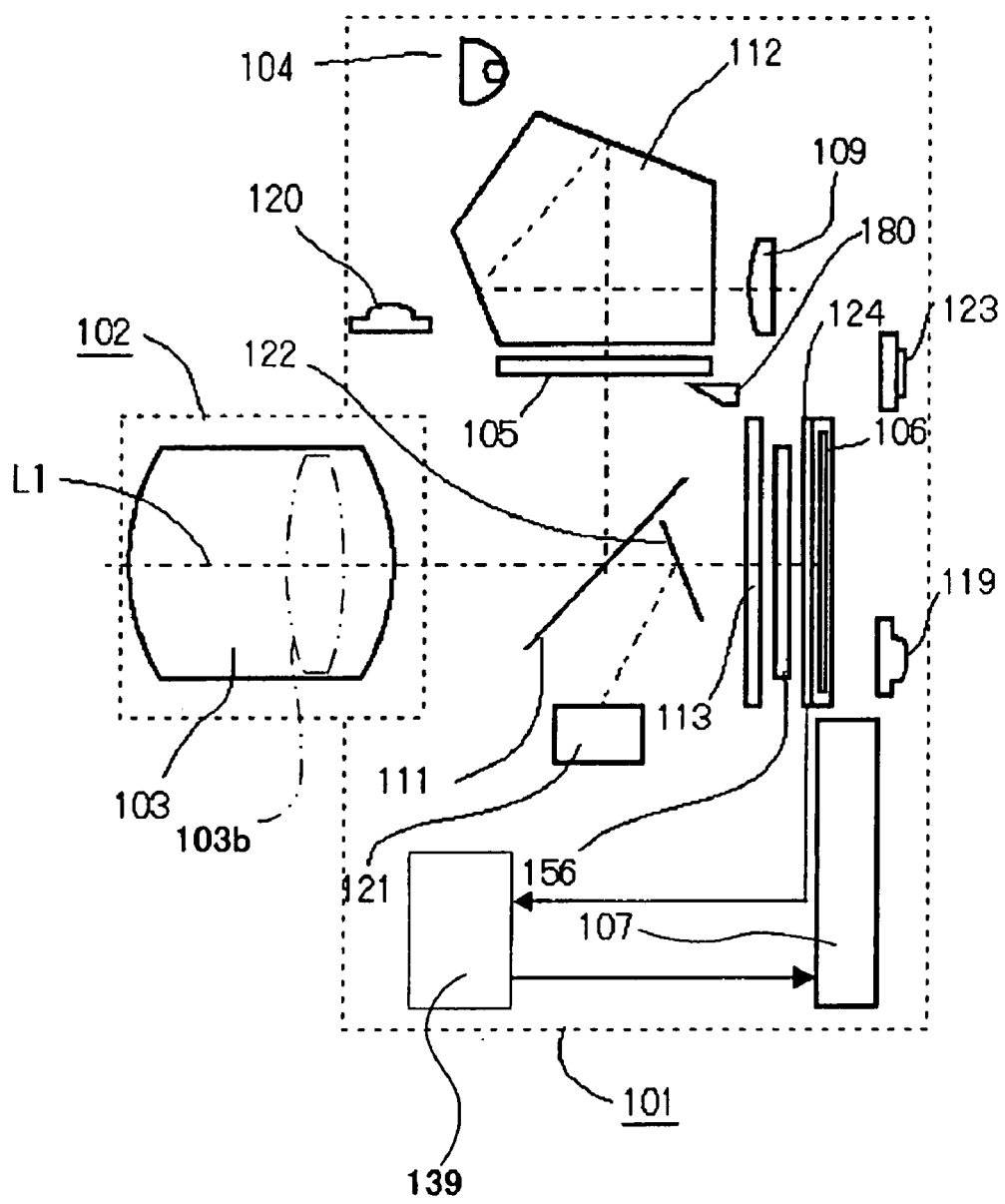
FIG. 4 schematically shows the structure of the image-taking apparatus of Embodiment 1.

FIG. 4 schematically shows the structure of a single-lens reflex digital camera serving as an image-taking apparatus which is Embodiment 1 of the present invention. The camera of Embodiment 1 is a single-panel digital color camera which employs an image-pickup device (a photoelectrical conversion element) such as a CCD sensor and a CMOS sensor and captures a moving image or a still image by driving the image-pickup device continuously or occasionally as required. The image-pickup device is an area sensor which has the function of converting light received on its light-receiving surface into an electric signal for each pixel and reads charge accumulated on each pixel in accordance with the received light amount. While "image taking" means both capturing an image of an object (a subject) with the image-pickup device for record and capturing an image of the object with the image-pickup device for display (observation) on a display. In Embodiment 1, the former is particularly referred to as image taking or image-taking operation.

In FIG. 4, reference numeral 101 shows a camera body, and 102 an image-taking lens which includes an image-forming optical system 103 and is mounted removably on the camera body 101. The image-taking lens 102 is electrically and mechanically connected to the camera body 101 via a known mount mechanism. Image-taking lenses with different focal lengths can be selectively mounted on the camera body 101 to take images at various angles of view.

The image-taking lens 102 has a driving mechanism, not shown. A focusing lens 103b forming part of the image-forming optical system 103 is moved by the driving mechanism in the direction of an optical axis L1 to allow focusing on an object. The focusing lens may be formed of a flexible transparent elastic member or a liquid lens to change the shape of the boundary face to vary the refractive index, thereby achieving focusing on an object.

Reference numeral 106 shows an image-pickup device put in a package 124. An optical low pass filter 156 which passes only the light components in a predetermined frequency range is provided on an optical path (hereinafter referred to as an image-taking optical path) between the image-forming optical system 103 and the image-pickup device 106 to prevent the light components of an object image at spatial frequencies higher than necessary from reaching the image-pickup device 106. The package 124 also includes an infrared cut filter which cuts infrared rays.

An image processing circuit 139 performs various types of image processing on the signal of accumulated charge read from the image-pickup device 106 to produce an image signal. The produced image signal is displayed as an image on a display 107. The display 107 is attached to the back of the camera body 101 to allow a user to observe the object image on the display 107. The display 107 is preferably formed of a thin device with low power consumption such as an organic EL spatial modulation device, a liquid crystal spatial modulation device, and a spatial modulation device using electrophoresis of particles.

Embodiment 1 employs a CMOS process-compatible sensor (a CMOS sensor) which is one of amplification-type solid-state image-pickup devices, as the image-pickup device 106. The CMOS sensor has the characteristic of allowing a significant reduction in the number of masks and the number of process steps as compared with a CCD sensor since the CMOS sensor can be realized by forming both MOS transistors in an area sensor portion and peripheral circuits such as an image-pickup device driving circuit, an AD converter circuit, and an image processing circuit, in the same process. The CMOS sensor also has the characteristic of enabling random access to an arbitrary pixel to facilitate selective read-out for display. By taking advantage of these characteristics of the image-pickup device 106, Embodiment 1 achieves real-time display of moving images at a high display rate and display of still images with high definition.

Reference numeral 111 shows a main mirror formed of a half mirror which can be turned into and outside the image-taking optical path and can be rotated in the image-taking optical path to change its position. Reference numeral 105 shows a focusing screen which is disposed on the expected image-forming surface of an object image, and 112 a pentaprism. Reference numeral 109 shows a lens for observing an image in an optical viewfinder, and the lens 109 is formed of three lenses (lenses 109-1, 109-2, and 109-3 shown in FIG. 1). The focusing screen 105, the pentaprism 112, and the lens 109 constitute a viewfinder optical system. The main mirror 111 is made of a material having a refractive index of approximately 1.5 and having a thickness of 0.5 mm.

Reference numeral 122 shows a sub mirror which is provided pivotably at the back of the main mirror 111. The main mirror 111 and the sub mirror 122 constitute an optical path splitting system (or an optical path splitting unit) which is used to switch between three optical states as shown in FIGS. 1 to 3, later described.

Figure 2:
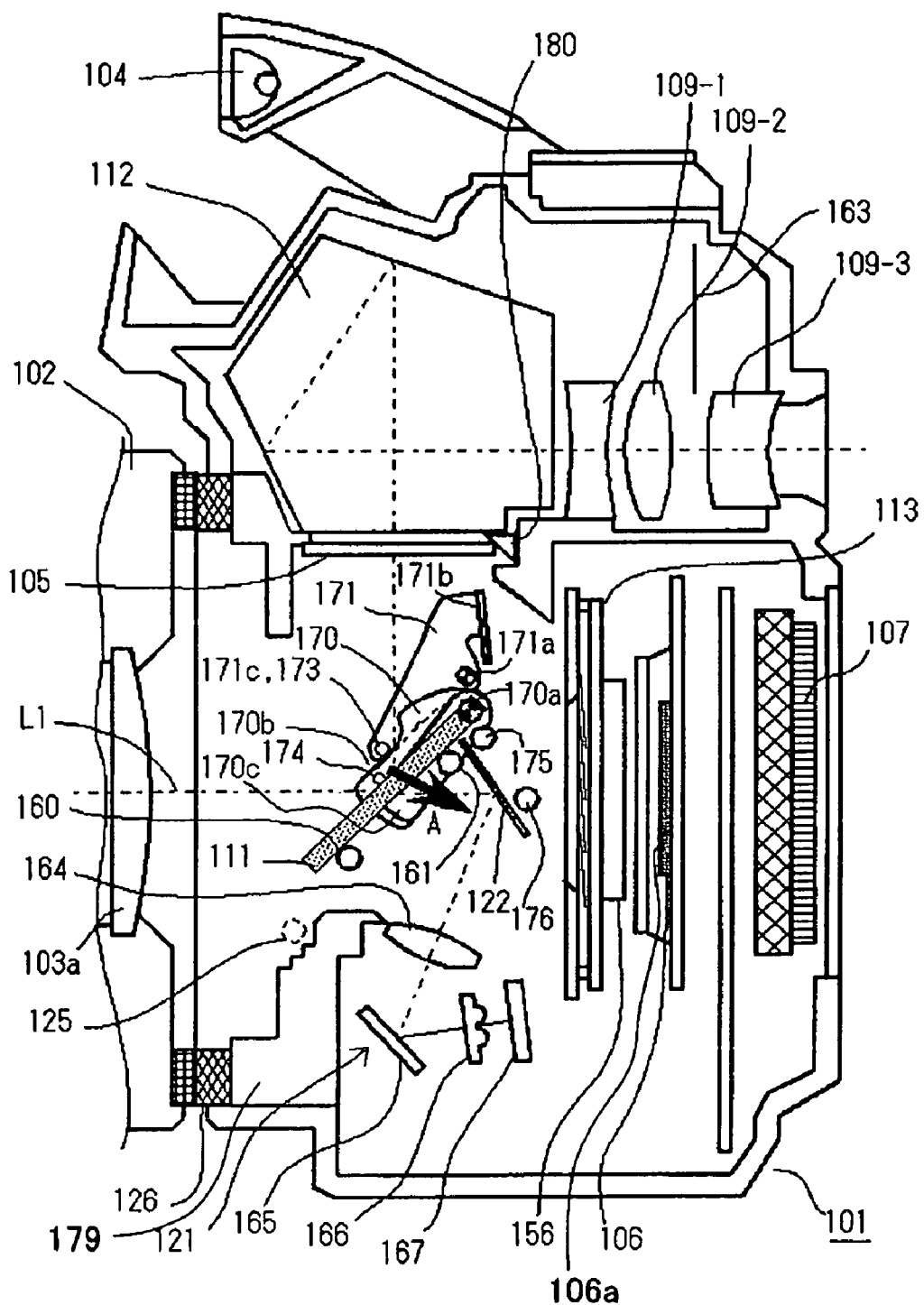
FIG. 2 is a section view of the image-taking apparatus (in a first optical path state) of Embodiment 1.

In a first optical path state (a third state) shown in FIG. 2, the main mirror 111 and the sub mirror 122 are disposed in the image-taking optical path. The main mirror 111 reflects part of a luminous flux (light) from the image-forming optical system 103 toward the viewfinder optical system and transmits the remaining light. The luminous flux transmitted through the main mirror 111 is then reflected by the sub mirror 122 and directed to a focus detection unit 121, later described. This allows observation of an object image with the viewfinder optical system and auto-focus operation based on the result of detection by the focus detection unit 121. The focus detection unit 121 detects the focus state of the image-forming optical system 103 with the phase difference detection method.

Figure 1:
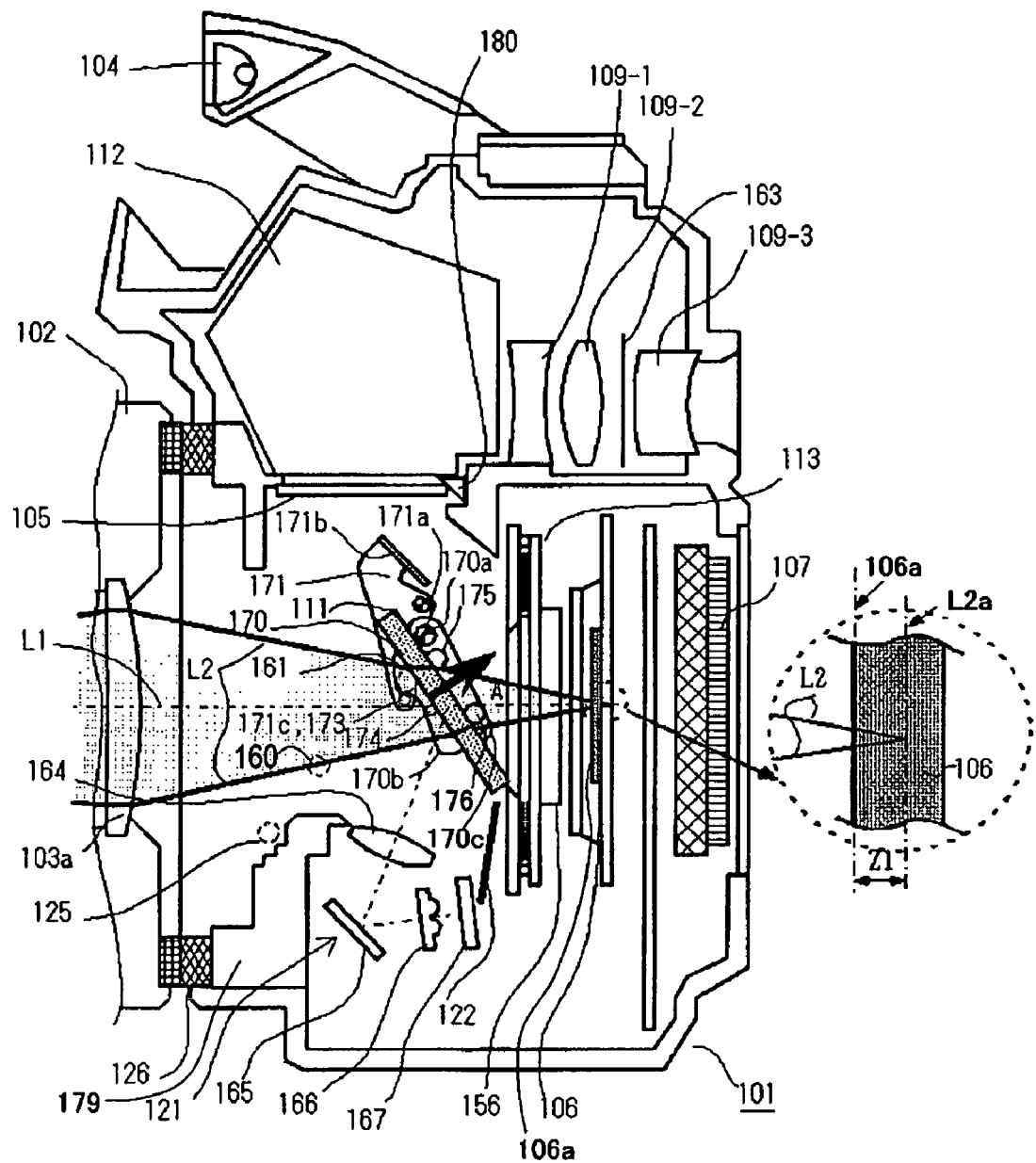
FIG. 1 is a section view of an image-taking apparatus (in a second optical path state) which is Embodiment 1 of the present invention.

In a second optical path state (a first state) shown in FIG. 1, the main mirror 111 is disposed in the image-taking optical path and the sub mirror 122 is retracted from the image-taking optical path. The main mirror 111 transmits and directs part of a luminous flux (light) from the image-forming optical system 103 toward the image-pickup device 106 and reflects the remaining light toward the focus detection unit 121. This enables display of an object image in real time on the display 107 and continuous image-taking at a high speed as well as auto-focus operation based on the result of detection by the focus detection unit 121. In other words, in the second optical path state, an image can be taken on the basis of the observed object image on the display 107 without driving the optical path splitting system, so that the fast continuous image-taking can be performed by increasing the speed of a signal processing system. In the second optical path state, fast focusing is possible with the phase difference detection method while the object image is displayed on the display 107.

Figure 3:
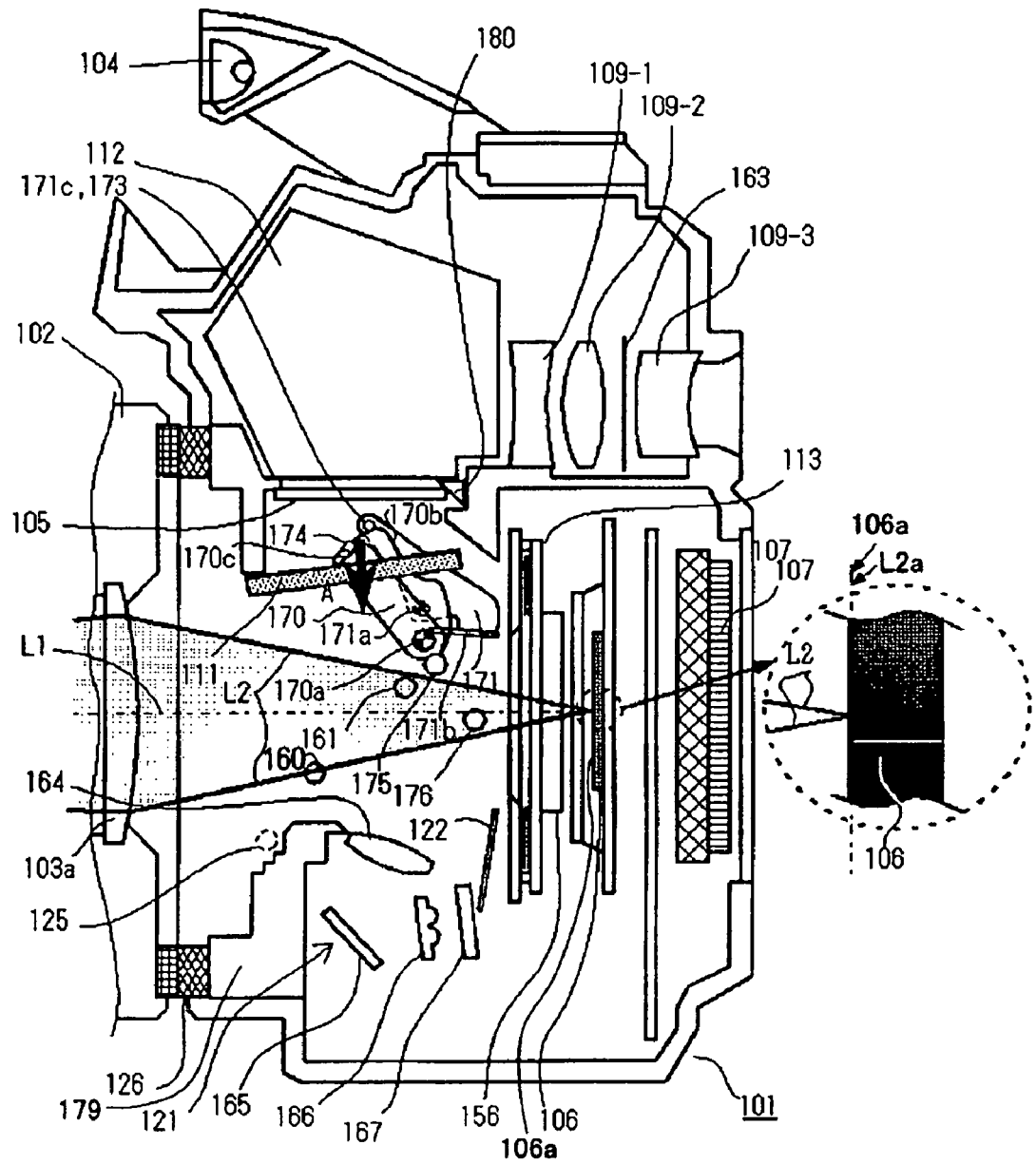
FIG. 3 is a section view of the image-taking apparatus (in a third optical path state) of Embodiment 1.

In a third optical path state (a second state) shown in FIG. 3, the main mirror 111 and the sub mirror 122 are retracted from the image-taking optical path. A luminous flux from the image-forming optical system 103 reaches the image-pickup device 106. This allows image taking without a reduction in light amount or coloring which may occur in the presence of the main mirror 111 and the sub mirror 122. The third optical path state is preferable for taking a still image with high definition suitable for a large photo print.

To switch between the three states quickly, the main mirror 111 is made of transparent resin to have a lightweight. A polymer thin film with birefringence is attached to the back of the main mirror 111 to provide a greater low pass effect in order to capture an image without using all the pixels of the image-pickup device 106 in real-time display of an image or continuous image-taking at a high speed.

It is possible that the surface of the main mirror 111 is provided with a fine periodical structure made of resin and having a pitch smaller than the wavelength of visible light. The periodic structure may serve as a photonic crystal to reduce the surface reflection of light resulting from a difference in refractive index between the air and the resin, thereby enhancing the light use efficiency. Such a structure can prevent occurrence of a ghost due to multiple reflection of light on the back and front surfaces of the main mirror 111 in the second optical path state.

The main mirror 111 and the sub mirror 122 are moved to switch between the three optical path states by a mirror driving mechanism formed of an electromagnetic motor and a gear train, not shown.

Reference numeral 104 shows a movable flash unit, 113 a focal plane shutter, 119 a main switch for power on and power off, 120 a release button, 123 a viewfinder mode switch, and 180 an in-viewfinder display unit. The release button 120 can be pressed in two steps. When it is half pressed to turn on an SW1, photometric operation and AF operation are performed. When it is fully pressed to turn on an SW2, image recording operation is performed. The viewfinder mode switch 123 is used to select an OVF mode corresponding to the first optical path state or an EVF mode corresponding to the second optical path state.

Figure 5:
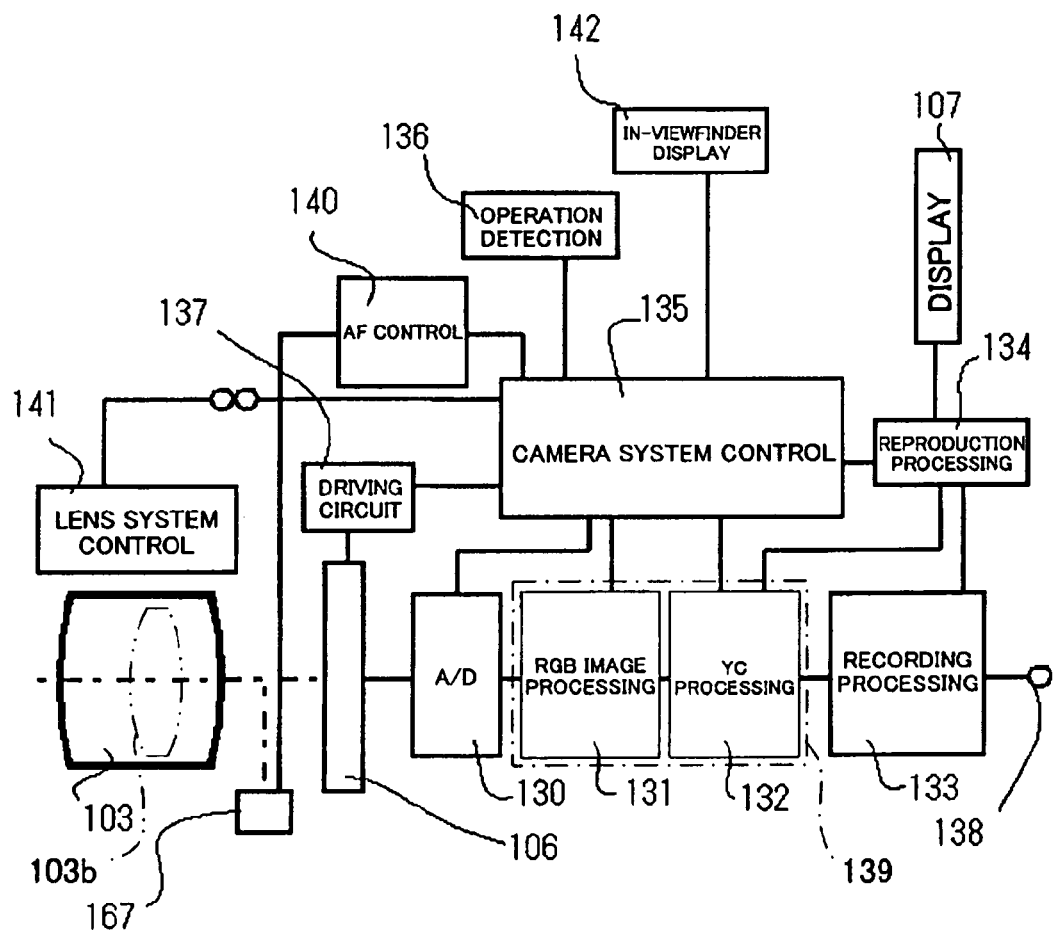
FIG. 5 is a block diagram showing the electrical structure of the image-taking apparatus of Embodiment 1.

FIG. 5 shows the electrical structure of the camera of Embodiment 1. The camera has an optical processing system (an image-taking system), an image processing system, a recording/reproduction system, and a control system.

The optical processing system includes the image-forming optical system 103 and the image-pickup device 106. The image processing system includes an A/D converter 130 and the image processing circuit 139 (an RGB image processing circuit 131 and a YC processing circuit 132). The recording/reproduction system includes a recording processing circuit 133 and a reproduction processing circuit 134. The control system includes a camera system control circuit 135, an operation detecting circuit 136, and an image-pickup device driving circuit 137.

Reference numeral 138 shows a standardized connection terminal which is externally connected to a computer or the like to transmit and receive data. These electric circuits are driven by a small fuel cell, not shown.

The optical processing system forms an image of light from an object on the light-receiving surface of the image-pickup device 106, that is, on an image-pickup surface 106a via the image-forming optical system 103. The optical processing system controls an aperture, not shown, provided in the image-taking lens 102 and controls the focal plane shutter 113 as required to expose the image-pickup device 106 to an appropriate amount of the object light. The image-pickup device 106 has approximately 10 million square-shaped pixels in total, in which 3700 pixels are arranged in the long side direction and 2800 pixels are arranged in the short side direction. Each pixel is provided with one of color filters for R (red), G (green), and B (blue). The pixels are arranged in the so-called Bayer pattern in which four pixels consisting of one R pixel, one B pixel, and two G pixels make a set.

In the Bayer pattern, more G pixels are disposed than R pixels and B pixels to increase the general image performance since a user tends to perceive intensely the G color while seeing an image. Typically, in image processing with the image-pickup device of this type, a luminance signal is produced mainly from G, while a color signal is produced from R, G, and B.

The image signal read from the image-pickup device 106 is supplied to the image processing system through the A/D converter 130. The A/D converter 130 converts the signal from each pixel into a digital signal in accordance with the amplitude, for example, a 10-bit signal before output. The subsequent image processing is performed digitally.

The image processing system provides an image signal in a desired form from the digital signal for R, G, and B. Specifically, the color signal for R, G, and B is converted into, for example, a YC signal represented by a luminance signal Y and color-difference signals (R-Y), (B-Y).

The RGB image processing circuit 131 processes the signal of the image (the 3700-by-2800-pixel image) received from the image-pickup device 106 via the A/D converter 130. The RGB image processing circuit 131 has a white balance circuit, a gamma correction circuit, and an interpolating calculation circuit which increases resolution through interpolating calculations.

The YC processing circuit 132 produces the luminance signal Y and the color-difference signals R-Y, B-Y. The YC processing circuit 132 is formed of a high-frequency luminance signal producing circuit for producing a high-frequency luminance signal YH, a low-frequency luminance signal producing circuit for producing a low-frequency luminance signal YL, and a color-difference signal producing circuit for producing color-difference signals R-Y, B-Y. The luminance signal Y is produced by combining the high-frequency luminance signal YH and the low-frequency luminance signal YL. In the second optical path state, the YC processing circuit 132 performs edge enhancement processing for darkening the color of the outline of the object in the produced image to provide more visibility.

The recording/reproduction system outputs the image signal to a memory and outputs the image signal to the display 107. The recording processing circuit 133 performs writing processing and reading processing of the image signal to and from the memory. The reproduction processing circuit 134 reproduces the image signal read from the memory and outputs it on the display 107.

The recording processing circuit 133 has a compression/decompression circuit therein for compressing the YC signal representing a still image or a moving image with a predetermined compression method and for decompressing the compressed data when it is read out. The compression/decompression circuit includes a frame memory for signal processing or the like, accumulates the YC signal from the image processing system for each frame in the frame memory, and reads it for each block to perform compression and coding thereof. The compression and coding are performed, for example, through two-dimensional orthogonal transform, normalization, and Huffman coding of the image signal for each block.

The reproduction processing circuit 134 performs matrix transformation of the luminance signal Y and the color-difference signals R-Y, B-Y into an RGB signal or the like. The signal changed by the reproduction processing circuit 134 is then output to the display 107 to reproduce and display a visible image. The reproduction processing circuit 134 may be connected to the display 107 through a wireless communication means with the Bluetooth. Such a structure allows a user to remotely monitor the image captured by the digital camera.

The control system has the operation detection circuit 136 which detects operation on the main switch 119, the release button 120, the viewfinder mode switch 123 and others, and the camera system control circuit 135 which controls the respective portions including the main mirror 111 and the sub mirror 122 in response to the detection signal from the operation detection circuit 136. The camera system control circuit 135 also produces a timing signal for starting accumulation of charge and reading the accumulated charge in the image-pickup device 106. The camera system control circuit 135 controls the image-pickup device driving circuit 137 which produces a driving signal for driving the image-pickup device 106 and an information display circuit 142 which controls the in-viewfinder display unit 180 for displaying information in the optical viewfinder.

The control system controls the optical processing system, the image processing system, and the recording/reproduction system in response to external operation. For example, the control system detects the state of the SW2 associated with the release button 120 to control the driving of the image-pickup device 106, the operation of the RGB image processing circuit 131, and the compression processing of the recording processing circuit 133, and controls the information display circuit 142 to light each segment in the in-viewfinder display unit 180.

Next, the structure for focus adjustment will be described. The camera system control circuit 135 is connected to an AF control circuit 140 and a lens system control circuit 141. They communicate data necessary for the processing thereof via the camera system control circuit 135.

The AF control circuit 140 receives a signal output from a focus detection sensor 167 which covers a focus detection area set in a predetermined single or plurality of positions on the image-taking screen. The AF control circuit 140 produces a focus detection signal which represents the state of image formation of the image-forming optical system 103 based on the output signal. If defocus is detected, the AF control circuit 140 converts the defocus amount into a driving amount of the focusing lens 103b which forms part of the image-forming optical system 103, and transmits the signal representing the driving amount to the lens system control circuit 141 via the camera system control circuit 135.

For a moving object, the AF control circuit 140 provides a driving amount of the focusing lens 103b to a position which is determined by taking account of a time lag between the press of the release button 120 and the start of image-taking operation. When it is determined that the luminance of an object is low and sufficient accuracy cannot be provided for focus detection, the AF control circuit 140 causes the flash unit 104 or a white color LED or an arc tube, not shown, to emit light to illuminate the object.

Upon reception of the driving amount of the focusing lens 103b, the lens system control circuit 141 drives the focusing lens 103b in the direction of the optical axis L1 by the driving mechanism, not shown, in the image-taking lens 102. This achieves focusing on the object.

The lens system control circuit 141 communicates with the image-taking lens 102 to obtain various types of lens information about the image-taking lens 102. It receives various types of lens information necessary for the image-taking apparatus 101, for example, the full-open F-number, the minimum F-number, information about the pupil position of the lens, information about the emergence window, and correction values for correcting the focus position (the image-forming position) of luminous flux for image taking and the focus position of luminous flux for focus detection. The lens information is transmitted to the camera system control circuit 135 for use in focus detection or photometric correction.

When the AF control circuit 140 detects focus achieved on the object, the camera system control circuit 135 is notified of that information. Then, if the release button 120 is pressed to turn on the SW2, the image-taking operation is performed by the optical processing system, the image processing system, and the recording/reproduction system as described above.

FIGS. 1 to 3 show the structure of the mirror driving mechanism in Embodiment 1 of the present invention. First, the structure of the mirror driving mechanism will be described with reference to FIG. 2. FIG. 2 shows the first optical path state of the optical path splitting system formed of the main mirror 111 and the sub mirror 122. In FIG. 2, components identical to those shown in FIG. 4 are designated with the same reference numerals as those in FIG. 4.

In FIG. 2, reference numeral 103a show a lens disposed closest to the image in a plurality of lenses forming the image-forming optical system 103. Reference numeral 126 shows a lens mount on which the image-taking lens 102 is mounted. The mirror driving mechanism is held by a mirror box 179 fixed to the camera body 101. The lens mount 126 is fixed to the front end of the mirror box 179.

The main mirror 111 is held by a main mirror receiving plate, not shown. The main mirror receiving plate is provided with pins 173 on both sides thereof in the direction perpendicular to the sheet of FIG. 2, and a pin 174 on the side in the penetrating direction through the sheet.

Reference numeral 170 shows a main mirror driving lever, and 171 a main mirror support arm. The main mirror driving lever 170 is rotated about an axis 170a held by the mirror box 179. The main mirror support arm 171 is rotated about an axis 171a held by the mirror box 179.

The main mirror support arm 171 has a generally symmetrical shape with respect to the optical axis L1 in the direction perpendicular to the sheet of FIG. 2. A connection 171b connects parts of the main mirror support arm 171 on both sides thereof in the direction perpendicular to the sheet of FIG. 2.

The pins 173 on both sides of the main mirror 111 and the main mirror receiving plate are rotatably fitted into through-holes 171c formed in the end of the main mirror support arm 171. This allows the main mirror 111 to be rotatable about the pins 173. A biasing force in the direction of an arrow A is provided by a torsion spring, not shown, at the intermediate position between the pins 173 and the pin 174 in the main mirror receiving plate. This biases the main mirror 111 in the direction to switch to the second optical path state.

In the first optical path state, mirror stoppers 160 and 161 are put on the movement track of the main mirror 111. A slight interval is present between the pins 173 and a first cam surface 170b of the main mirror driving lever 170 and between the pin 174 and a second cam surface 170c of the main mirror driving lever 170. The main mirror 111 abuts on the mirror stoppers 160 and 161 to be positioned at a predetermined position in the image-taking optical path. At this point, the main mirror 111 faces an obliquely upper portion of the camera body 101 in which the viewfinder optical system is provided.

The sub mirror 122 is controlled its rotation about an axis 125 and located at a predetermined position in the image-taking optical path at the back of the main mirror 111 in order to reflect the light transmitted through the main mirror 111.

A luminous flux emerging from the image-forming optical system 103 and reflected by the main mirror 111 is then directed to the viewfinder optical system, while the remaining luminous flux transmitted through the main mirror 111 is then reflected by the sub mirror 122 and directed to the focus detection unit 121.

When the mirror stoppers 161 and 161 are retracted or the main mirror driving lever 170 is rotated in the clockwise direction, the biasing force produced by the torsion spring, not shown, in the direction of the arrow A causes the pins 173 to abut on the first cam surface 170b of the main mirror driving lever 170 and the pin 174 to abut on the second cam surface 170c of the main mirror driving lever 170. As a result, the pins 173 and 174 are slid along the first cam surface 170b and the second cam surface 170c, respectively, in accordance with the position of rotation of the main mirror driving lever 170, thereby changing the position (the rotation position) of the main mirror 111. Specifically, the main mirror support arm 171 is rotated in association with the rotation of the main mirror driving lever 170, and they drive the main mirror receiving plate, not shown, which has the pins 173 and 174, and the main mirror 111 together. This achieves switching to the second optical path shown in FIG. 1 or the third optical state shown in FIG. 3.

In the second optical path state in FIG. 1, the main mirror 111 is disposed in the image-taking optical path and the submirror 122 is retracted from the image-taking optical path as described above. The main mirror 111 faces a obliquely lower portion of the camera body in which the focus detection unit 121 is disposed. A luminous flux emerging from the image-forming optical system 103 and transmitted through the main mirror 111 is then directed to the image-pickup device 106, while the remaining luminous flux reflected by the main mirror 111 is then directed to the focus detection unit 121.

In the third optical path shown in FIG. 3, the main mirror 111 and the sub mirror 122 are retracted upward from the image-taking optical path. Thus, a luminous flux emerging from the image-forming optical lens 103 then reaches the image-pickup device 106.

Next, the focus detection unit 121 will be described. In FIGS. 1 to 3, reference numeral 164 shows a condenser lens, 165 a reflecting mirror, 166 an image-reforming lens, and 167 a focus detection sensor.

A luminous flux emerging from the image-forming lens 103 and reflected by the sub mirror 122 (in the first optical path state) or the main mirror 111 (in the second optical path state) then enters the condenser lens 164 provided in a lower portion of the mirror box 179, is reflected by the reflecting mirror 165, and forms a two-dimensional image of the object on the focus detection sensor 167 by the image-reforming lens 166.

The focus detection sensor 167 includes at least two lines of pixels which output signals with waveforms relatively shifted depending on the image-forming position of the object image formed by the image-forming optical lens 103, that is, the focusing state of the image-forming optical system 103 for the object. The waveforms of the output signals are shifted in opposite directions in front focus and rear focus. Thus, the phase difference which corresponds to the shift amount can be detected including the direction with the technique such as correlation calculations to determine the amount and direction of driving of the focusing lens 103b for achieving focus. The phase difference detection method is performed in this manner.

In general, part of an incident luminous flux through the fully-opened aperture is used in the focus detection. In other words, a luminous flux with a small F-number is used in the focus detection. When errors in the mechanism are taken into account, it cannot be said that the position of the image-pickup device 106 is exactly conjugate to the position of the focus detection sensor 167. As a result, a slight initial phase difference $\Delta$ is present even when the camera is focused on the object image. The presence of the initial phase difference $\Delta$ generally provides no problem since the true phase difference can be obtained by subtracting the initial phase difference $\Delta$ from the phase difference determined through the correlation calculations of the two images.

However, there is a problem that the position of the reflecting surface of the sub mirror 122 in the first optical path state does not completely match the position of the reflecting surface of the main mirror 111 in the second optical path state in view of the mechanical accuracy. In ordinary accuracy of part machining, the position of the reflecting surface may be displaced by approximately 30 μm in the direction of the normal thereto. When attempts are made to reduce the displacement, the cost for part machining is extremely increased. To solve the problem, the initial phase difference $\Delta$ is set for each of the first optical path state and the second optical path state to use a different correction amount for the focus detection result in each of the states of the optical path splitting system. This enables focus detection with favorable accuracy in any case.

In this manner, the determination of the identity of the signals with the initial phase difference enables focus detection. The phase difference can be detected by using a known technique with the correlation calculations, for example, a technique disclosed in Japanese Patent Publication No. 5(1993)-88445 to determine the defocus amount. The determined defocus amount can be changed into a driving amount of the focusing lens 103b of the image-forming optical system 103 to perform auto-focusing. In the auto-focus operation with the phase difference detection method as described above, the driving amount and direction of the focusing lens 103b are previously known, so that only one driving of the focus lens 103b is often required to reach the in-focus position and thus the in-focus state can be achieved very quickly.

Next, the image-forming position of the luminous flux in the first optical path state will be described with reference to FIG. 2. Part of the luminous flux L2 from an object (hereinafter referred to as an object luminous flux) emerging from the image-forming optical system 103 is then reflected by the main mirror 111 and directed to the viewfinder optical system, while the remaining luminous flux transmitted through the main mirror 111 is then directed to the focus detection unit 121 via the submirror 122 disposed at the back of the main mirror 111.

The mat surface of the focusing screen 105 and the image-pickup surface 106a of the image-pickup device 106 in the third optical path state are disposed substantially at optically equivalent positions.

Thus, when the object luminous flux L2 forms an image on the mat surface of the focusing screen 105, the object luminous flux L2 forms an image on the image-pickup surface 106a of the image-pickup device 106 if the transition is made to the third optical path state. If a user presses the release button 120 to turn on the SW1, AF operation is performed such that the image-forming position of the object luminous flux L2 matches the position of the image-pickup surface 106a of the image-pickup device 106 in the third optical path state. "Matching" includes complete matching and mismatching which may be considered as matching without any problems in practice. This applies to the following cases.

Since the object luminous flux L2 forms an image on the mat surface of the focusing screen 105 in the first optical path state, the user can observe the focused object image through the viewfinder optical system.

Next, the image-forming position of the luminous flux in the second optical path state will be described with reference to FIG. 1. Part of the object luminous flux L2 emerging from the image-forming optical system 103 is then reflected by the main mirror 111 and directed to the focus detection unit 121, while the remaining luminous flux transmitted through the main mirror 111 then reaches the image-pickup device 106. The reflecting surface of the main mirror 111 is disposed at a position substantially equivalent to the reflecting surface of the sub mirror 122 in the first optical path state. For this reason, the first optical path state and the second optical path state provide the same focus detection results from the focus detection unit 121 if the image-forming optical system 103 is in the same focus state.

In the second optical path state when the user presses the release button 120 to turn on the SW1, AF operation is performed such that the image-forming position L2a of the object luminous flux L2 in the third optical path state matches the position of the image-pickup surface 106a of the image-pickup device 106 as shown in the enlarged view in FIG. 1. In other words, in the second optical path state, the image-forming position L2a of the object luminous flux L2 is shifted behind the image-pickup surface 106a of the image-pickup device 106 by the length of the optical path corresponding to the thickness of the main mirror 111.

When the main mirror 111 has a thickness t of 0.5 mm and is made of a material having a refractive index d of 1.5, the shift amount Z1 of the image-forming position L2a of the object luminous flux L2 transmitted through the main mirror 111 is represented as:

$$Z1 = t \times (d-1)/d \quad (1)$$
$$= 0.5 \times (1.5 - 1)/1.5$$
$$= 0.17 \text{mm}$$

which means rear focus by the shift amount Z1 equal to 0.17 mm relative to the image-pickup surface 106a of the image-pickup device 106 in the second optical path state.

The conventional focus correction method will be described with reference to FIGS. 13 and 14. FIG. 13 shows the second optical path state in a camera with the conventional focus correction method. Since a main mirror 111 is present in the optical path in the second optical path state, the image-forming position La2 of the object luminous flux L2 is shifted behind by a shift amount Z1 as compared with the case where the luminous flux is not transmitted through the main mirror 111. As shown in an enlarged view in FIG. 13, in the conventional method, the focus detection result of a focus detection unit 121 is corrected such that the image-forming position L2a of the object luminous flux L2 transmitted through the main mirror 111 matches the position of a image-pickup surface 106a of a image-pickup device 106, and a focusing lens is driven on the basis of the corrected focus detection result. A user can observe the focused object image on a display 107 in the second optical path state.

FIG. 14 shows the state immediately after the transition to the third optical path state from the second optical path state shown in FIG. 13. Since the main mirror 111 is retracted from the image-taking optical path, the image-forming position L2a of the object luminous flux L2 is at a position shifted toward the front from the position of the image-pickup surface 106a by the length of the optical path corresponding to the thickness of the main mirror 111 (the shift amount Z1). Thus, in the conventional image-taking apparatus, when the transition is made to the third optical path state from the second optical path state, the focusing lens needs to be driven to shift the image-forming position L2a of the object luminous flux L2 backward by the shift amount Z1 to match the image-forming position L2a with the position of the image-pickup surface 106a.

An image-taking lens 102 is of an interchangeable type, and image-taking lenses having various focal lengths are mounted on a camera body 101. Many of telephoto image-taking lenses having a large focal length show a focus change amount (a defocus amount) of 10 mm or more in the direction of the optical axis L1 when the focusing lens is moved from the closest to the infinity. The focusing lens does not need to be moved greatly to provide the defocus amount of Z1 equal to 0.17 mm. Since that small moving amount of the focusing lens requires only a short time for the driving thereof, the release time lag is not significantly affected.

For wide-angle image-taking lenses having a small focal length, however, a focus change amount (a defocus amount) in the direction of the optical axis L1 is small and may be approximately 1 mm when the focusing lens is moved from the closest to the infinity. In this case, the focusing lens needs to be moved greatly to provide the defocus amount of Z1 equal to 0.17 mm. That large moving amount of the focusing lens requires a long time for the driving thereof. Even after the transition to the third optical path state is completed, release operation may not be performed since the driving of the focusing lens is not finished, thereby increasing a release time lag. With the increased release time lag, the image-taking operation is not smoothly performed even when the user presses the release button 120 to turn on the SW2, so that the user may miss an intended image.

In Embodiment 1, as shown in FIG. 1, the state in which the image-forming position L2a of the object luminous flux L2 is located behind the image-pickup surface 106a by the shift amount Z1 due to the presence of the main mirror 111 is maintained in the second optical path state. Thereby, immediately after the transition to the third optical path state from the second optical path state, the image-forming position L2a of the object luminous flux L2 matches the position of the image-pickup surface 106a of the image-pickup device 106. This eliminates the need to drive the focusing lens immediately after the transition to the third optical path state. Thus, the image-taking operation is not limited by the driving time of the focusing lens. In other words, the release time lag can be reduced.

However, when the image-forming position L2a of the object luminous flux L2 is shifted behind the image-pickup surface 106a by the shift amount Z1 in the second optical path state, a blurred image may be shown to the user who views the display 107.

Figure 6:
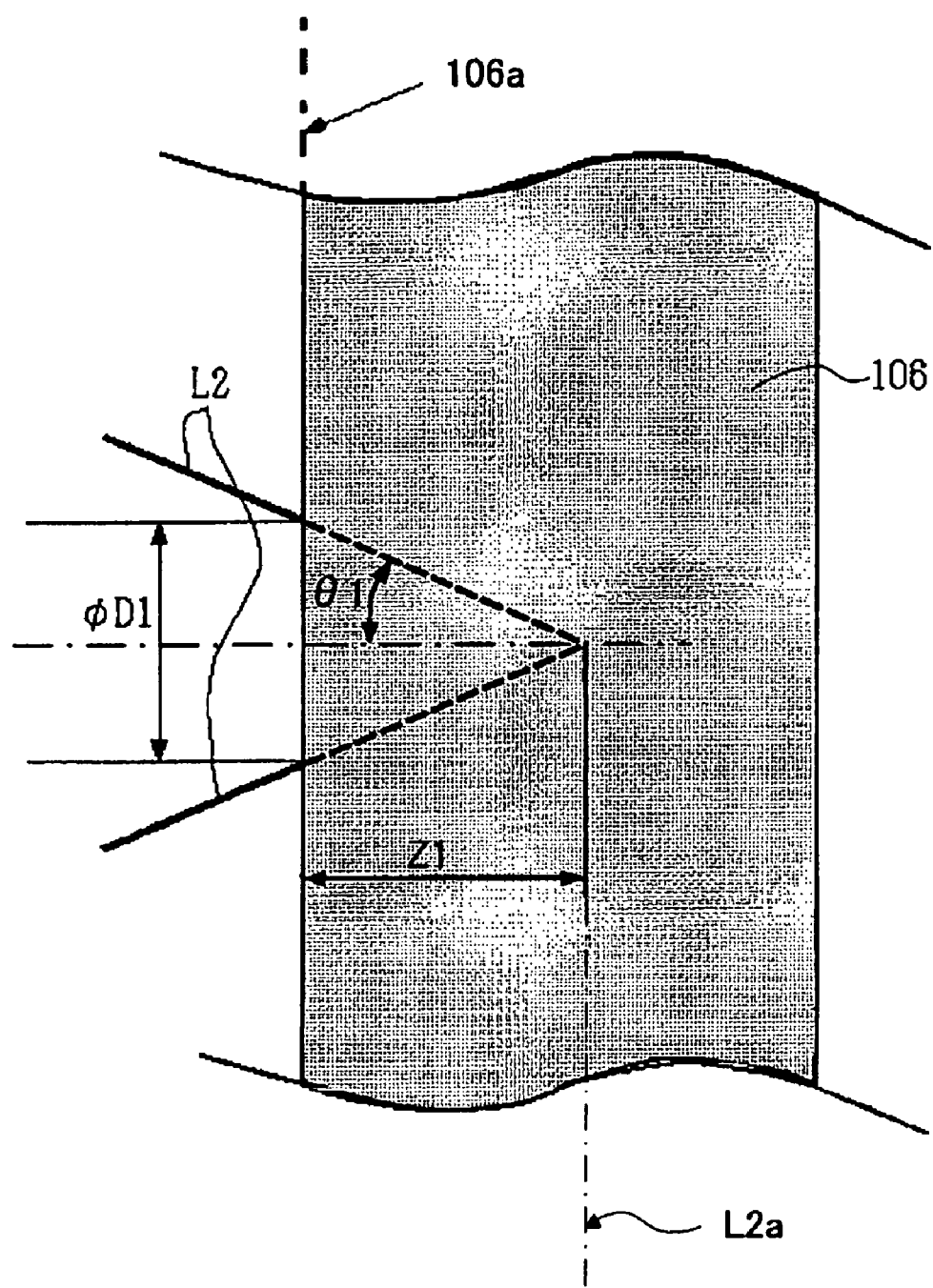
FIG. 6 is a schematic diagram showing object luminous flux entering an image-pickup surface of an image-pickup device.
Figure 7:
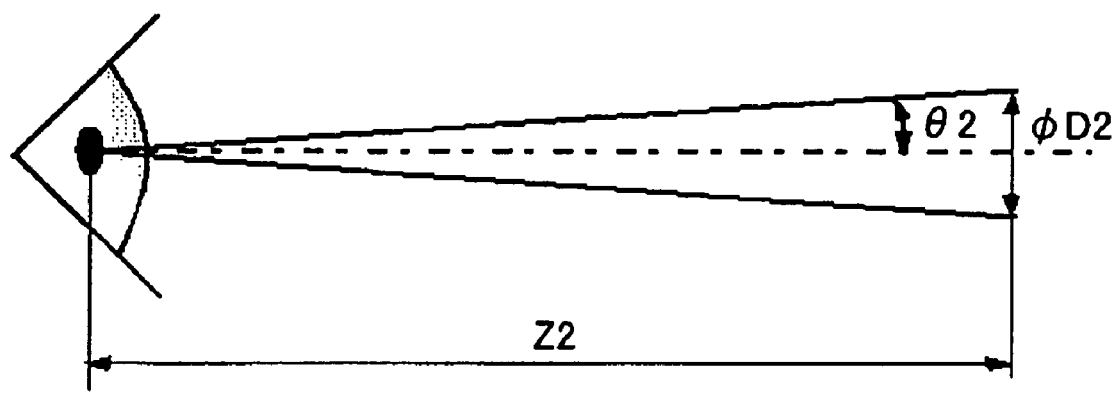
FIG. 7 is a schematic diagram for explaining a circle of confusion perceivable by human eyes.
Figure 8:
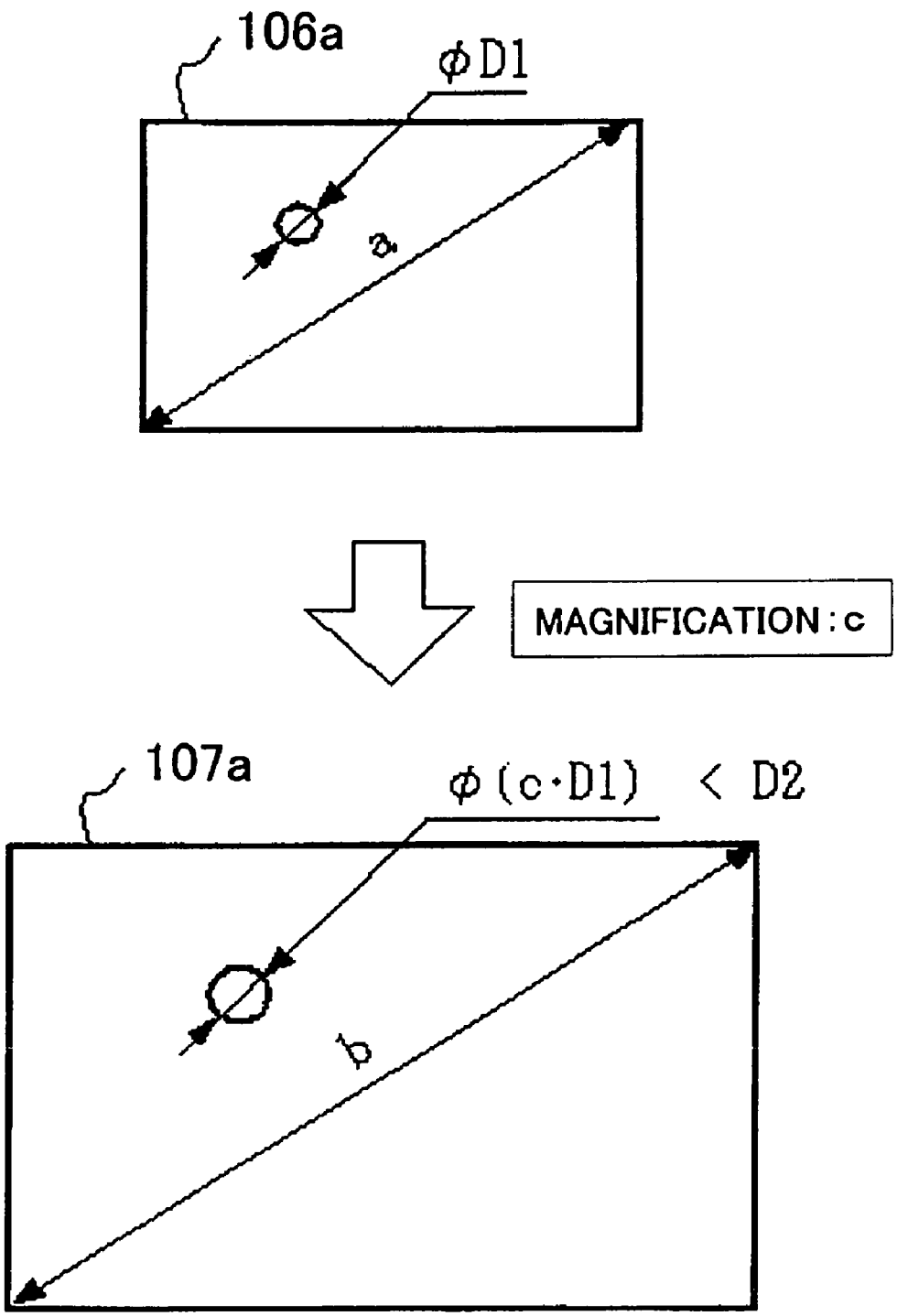
FIG. 8 is a schematic diagram showing how a circle of confusion on the image-pickup device is enlarged on a display.

Then, description will be made of how to prevent the user who views the display 107 from perceiving blur when the camera is focused at the position behind the image-pickup surface 106a by the shift amount Z1 with reference to FIGS. 6 to 8. FIG. 6 shows the object luminous flux L2 entering the image-pickup surface 106a of the image-pickup device 106.

As described above, the camera is focused at the position behind the image-pickup surface 106a by the shift amount Z1 in the second optical path state. This causes blur in accordance with the F-number of the image-forming optical system 103. The converging angle of the object luminous flux L2 is represented by θ1, and the diameter of a circle of confusion produced by the shift amount Z1 of the image-forming position is represented by φD1. Since Embodiment 1 contemplates the single-lens reflex camera with the interchangeable lens, image-taking lenses having various F-numbers may be mounted. With the same amount of defocus, the largest blur occurs when the image-taking lens having the smallest F-number is mounted. Then, the F-number is assumed to be 1.0 when the largest blur occurs. For the image-forming optical system having the F-number of 1.0, tanθ1 is given as follows:

$$\tan\theta 1 = \frac{1}{2} \quad (2)$$

The diameter φD1 of the circle of confusion produced by the shift amount Z1 of the image-forming position is represented as:

$$D1 = Z1 \times \tan\theta 1 \times 2 \quad (3)$$

When the values in the expressions (1) and (2) are substituted into the expression (3), the following is given:

$$D1 = 0.17 \times (1/2) \times 2 \quad (4)$$

$$= 0.17 \text{mm}$$

Consequently, the diameter φD1 of the circle of confusion produced in the second optical path state is approximately 0.17 mm.

Next, the size of a circle of confusion perceptible by human eyes will be described with reference to FIG. 7. In FIG. 7, θ2 shows a visibly recognized angle at which human eyes can recognize blur of an image, Z2 shows the distance from the human eyes to the display 107 (hereinafter referred to as an observation distance), and φD2 shows the diameter of the circle of confusion.

When a human sees a still image, it is generally said that the angle at which blur can be recognized is approximately 3 minutes (3'). When a user observes the object image displayed on the display 107, it may be appropriate to set a viewing angle of approximately twice that angle in the following reasons:

(1) The displayed image is a moving image displayed in real time; and (2) A very high-definition image is difficult to display due to the resolution of the display 107.

In Embodiment 1, the viewing angle θ2 at which human eyes can recognize blur is set to 6 minutes. When the observation distance is set to 375 mm, the diameter φD2 of the circle of confusion recognizable by human eyes is given as:

$$D2 = Z2 \times \tan\theta 2 \times 2 \quad (5)$$

$$= 375 \times \tan(6') \times 2$$

$$= 0.65 \text{mm}$$

Thus, if the diameter of the circle of confusion of the object image (the moving image) displayed on the display 107 is 0.65 mm or smaller, it may be difficult for the user to recognize that the object image is blurred.

Next, description will be made of the relationship between the diameter φD1 of the circle of confusion produced in the image-pickup device 106 and the diameter φD2 of the circle of confusion recognized on the display 107 with reference to FIG. 8.

The object image formed on the image-pickup device 106 is displayed on the display 107. Since the image-pickup surface 106a of the image-pickup device 106 and the display surface 107a of the display 107 have different sizes (the display surface 107a is larger), the image is enlarged at a specific magnification for display on the display 107. The magnification is represented by c. The magnification c is also referred to as an electronic magnification and is used when the object image taken by the image-pickup device 106 is displayed on the display 107.

The electronic magnification c is represented as:

$$c = b/a \quad (6)$$

where a represents the diagonal length of the image-pickup device 106, b the diagonal length of the display 107.

Since the diameter φD1 of the circle of confusion produced in the image-pickup device 106 is enlarged at the electronic magnification c and displayed on the display 107, the size of the circle of confusion on the display 107 is represented as:

$$\phi(c \times D1)$$

If the value determined from the expression φ(c×D1) is smaller than the φD2 of the circle of confusion recognized on the display 107, it is difficult for the user to recognize it as a blurred image. Thus, the following expression needs to be satisfied:

$$c \times D1 < D2 \quad (7)$$

When the values in the expressions (4) and (5) are substituted into the expression (7), the following is given:

$$c \times 0.17 < 0.65$$

$$c < 3.8 \quad (8)$$

If the relationship between the sizes of the image-pickup device 106 and the display 107 is set to satisfy the expression (8), the user does not recognize the image displayed on the display 107 as a blurred image even when the image-forming position L2a of the object luminous flux L2 is shifted from the image-pickup surface 106a of the image-pickup device 106 by the shift amount Z1 due to the length of the optical path increased by the main mirror 111 put into the image-taking optical path in the second optical path state. If the relationship between the sizes of the image-pickup device 106 and the display 107 does not satisfy the expression (8), the reproduction control circuit 134 performs control to reduce the size of the image for display on the display 107 such that the expression (8) is satisfied when the second optical path state is entered.

In other words, when the second optical path state is entered, the reproduction control circuit 134 does not perform an enlarged display in which the relationship between the sizes of the image-pickup device 106 and the display 107 do not satisfy the expression (8).

Thus, after the transition to the third optical path state from the second optical path state, the image-forming position L2a of the object luminous flux L2 by the image-forming optical system 103 matches the position of the image-pickup surface 106a of the image-pickup device 106 to avoid the need to drive the focusing lens 103b for focus correction. The start of image-taking operation is not limited by the time period necessary for the driving of the focusing lens 103b, so that the release time lag can be reduced.

In Embodiment 1, the abovementioned edge enhancement processing is performed in the second optical path state to reduce perceptible blur in the image displayed on the display 107.

Figure 9:
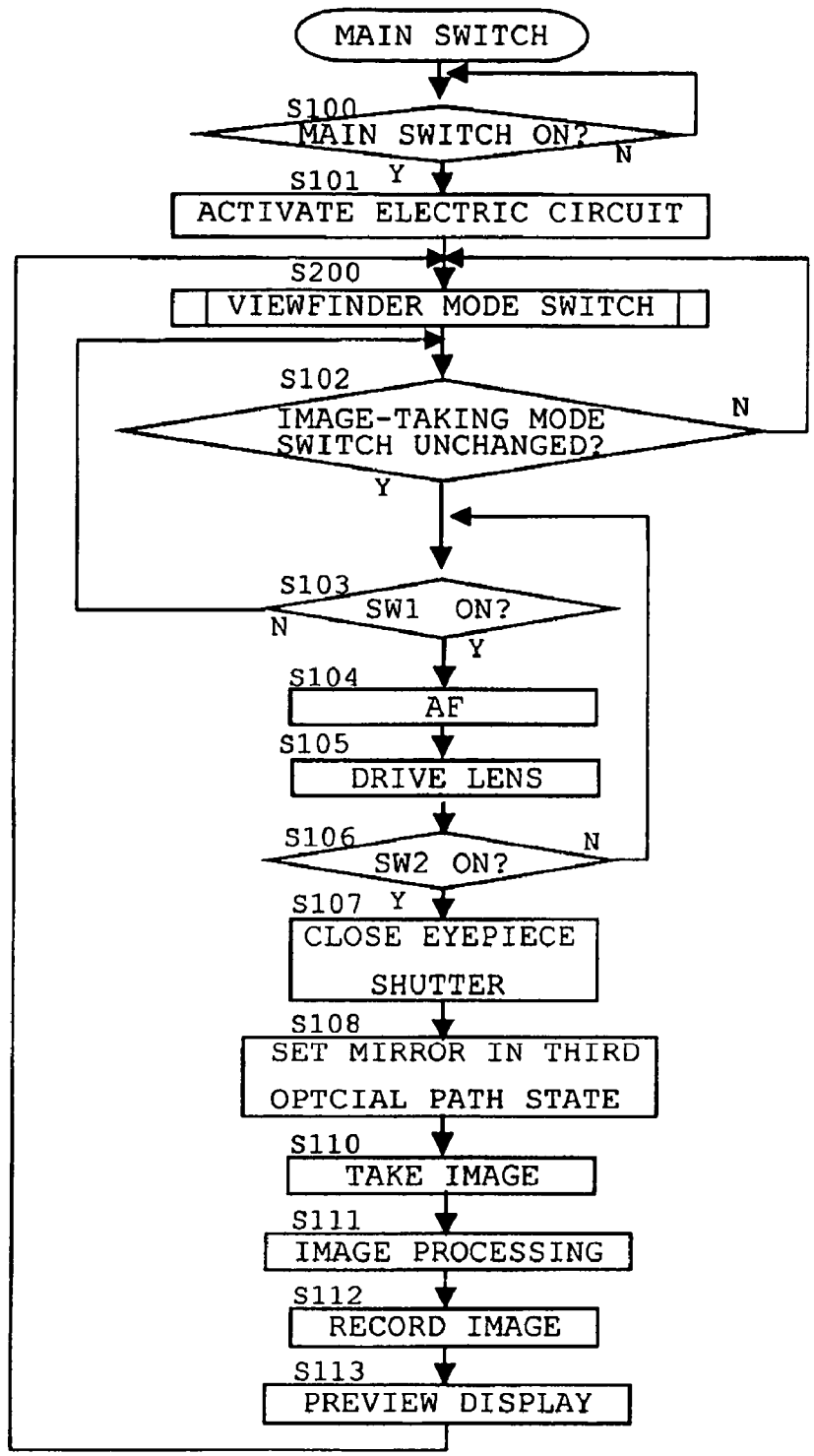
FIG. 9 is a flow chart showing the operation sequence of the image-taking apparatus of Embodiment 1.

Next, description will be made of the operation sequence mainly for the camera system control circuit 135 in the image-taking apparatus 101 of Embodiment 1 with reference to FIG. 9. The operation sequence is performed in accordance with a computer program stored in a memory (not shown) inside the camera system control circuit 135 or a memory (not shown) outside the camera system control circuit 135.

First, at step S100, the camera system control circuit 135 checks whether or not the main switch 119 is on. When it is on, the flow proceeds to step S101. At step S101, each electric circuit of the camera is activated.

At step S200, the camera system control circuit 135 performs a viewfinder mode switch subroutine, later described.

After the end of the viewfinder mode switch subroutine, the camera system control circuit 135 checks whether or not the viewfinder mode switch 123 is operated at step S102. When the operation of the viewfinder mode switch 123 is detected, the camera system control circuit 135 again performs the viewfinder mode switch subroutine at step S200. When the operation of the viewfinder mode switch 123 is not detected, the flow proceeds to step S103.

At step S103, the camera system control circuit 135 checks whether or not the release button 120 is pressed to turn on the SW1. When the SW1 is not turned on, the flow returns to step S102. When the SW1 is turned on, the flow proceeds to step S104.

At step S104, the camera system control circuit 135 transmits an AF start signal to the AF control circuit 140 to start the operation of the focus detection sensor 167.

At step S105, the camera system control circuit 135 calculates the driving amount and the driving direction of the focusing lens 103b for achieving focus based on the focus detection result (the defocus amount and direction) provided at step S104, and transmits a lens driving signal including that information to the lens system control circuit 141. The lens system control circuit 141 drives the focusing lens 103b based on the lens driving signal to adjust focus such that the image-forming position L2a of the object luminous flux L2 matches the position of the image-pickup surface 106a of the image-pickup device 106.

Next, at step S106, the camera system control circuit 135 checks whether or not the release button 120 is further pressed to turn on the SW2. When the SW2 is not turned on, the flow returns to step S103. When the SW2 is turned on, the flow proceeds to step S107.

At step S107, the eyepiece shutter 163 in the viewfinder optical system shown in FIGS. 1 to 3 is closed. The eyepiece shutter 163 is provided for avoiding occurrence of a ghost and flare after the transition is made to the third optical path state at the next step S108 by preventing light incident through the eyepiece of the viewfinder optical system from traveling in the opposite direction through the viewfinder optical system and reaching the image-pickup device 106.

At step S108, the camera system control circuit 135 transmits a mirror driving start signal to the mirror driving mechanism to set the main mirror 111 and the sub mirror 122 to the positions in the third optical path state (the retracted positions). The retraction of the main mirror 111 and the sub mirror 122 from the image-taking optical path enables the luminous flux from the image-forming optical system 103 to directly reach the image-pickup device 106.

Next, at step S110, the camera system control circuit 135 controls the aperture stop in the image-taking lens 102 and controls the focal plane shutter 113 as required to form an image from an appropriate amount of the object luminous flux L2 on the image-pickup surface 106a of the image-pickup device 106. The camera system control circuit 135 then transmits an image-taking start signal to the image-pickup device driving circuit 137 to perform image-taking operation by the image-pickup device 106.

At step S111, the signal read from the image-pickup device 106 is transmitted through the A/D converter 130 to the RGB image processing circuit 131 which performs white balance processing, gamma correction, and interpolation calculation processing. In addition, YR processing is performed in the YC processing circuit 132 to complete the image processing. The abovementioned image processing enables recording of a high-definition image.

At step S112, the image after the image processing is transmitted to the recording processing circuit 133 which then compresses the image with a predetermined compression method and records the compressed image on a recording medium.

At step S113, the image after the image processing is transmitted to the reproduction processing circuit 134 to perform preview display of the image on the display 107. After the preview display, the flow returns to the viewfinder mode switch subroutine (step S200) to set the optical path state in accordance with the state of the viewfinder mode switch 123.

Figure 10:
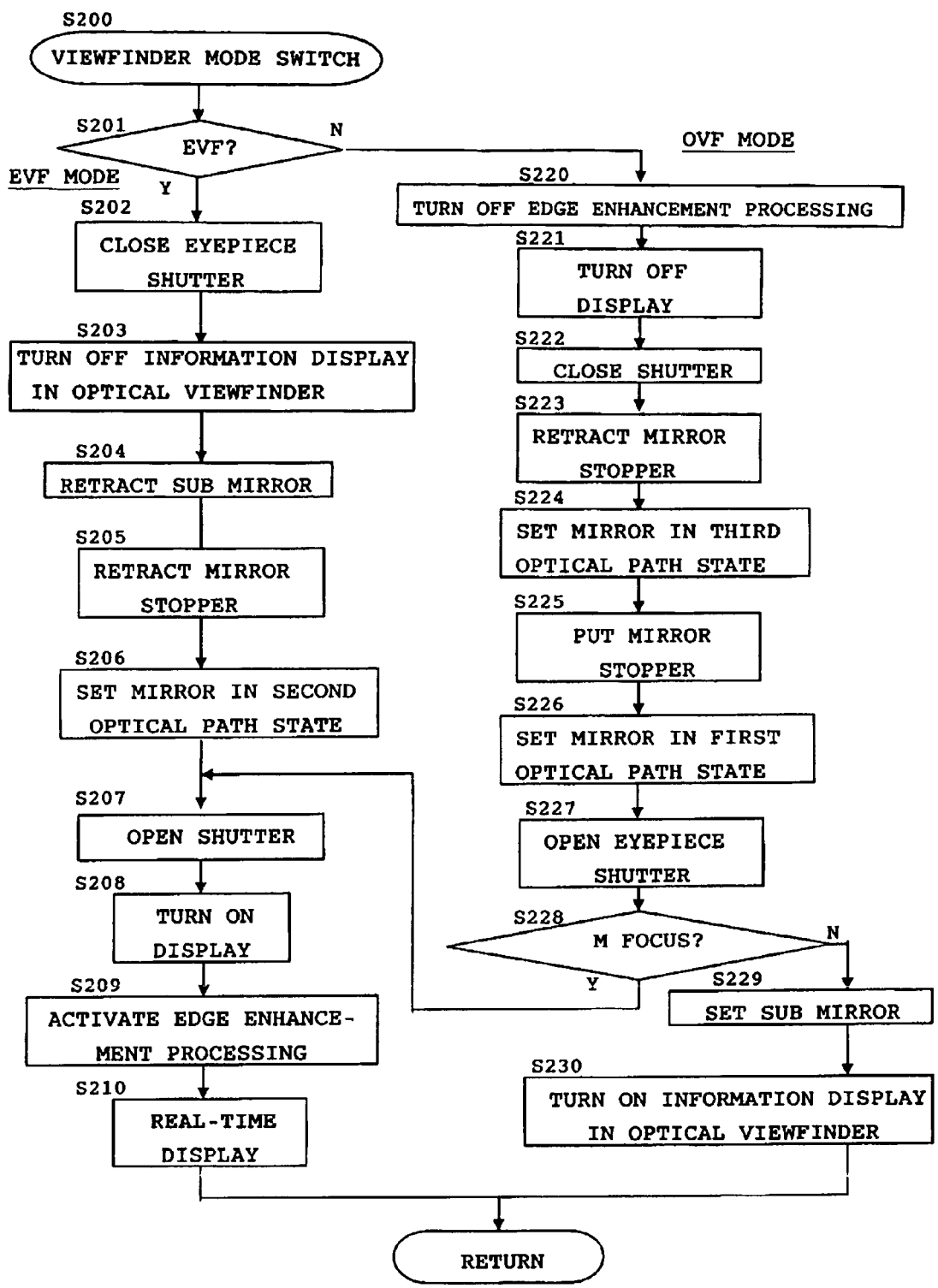
FIG. 10 is a flowchart showing a viewfinder mode switch subroutine in the image-taking apparatus of Embodiment 1.

Next, the viewfinder mode switch subroutine (step S200) will be described with reference to FIG. 10. Description is made assuming that the camera is initially in the first optical path state shown in FIG. 2.

At step S201, the camera system control circuit 135 checks the state of the viewfinder mode switch 123. In the following, the first optical path state and the second optical path state are referred to as the OVF (Optical ViewFinder) mode and the EVF (Electrical ViewFinder) mode, respectively. When the EVF mode is set, the flow proceeds to step S202. When the OVF mode is set, the flow proceeds to step S220.

At step S202, the camera system control circuit 135 closes the eyepiece shutter 163. This prevents light incident through the eyepiece of the viewfinder optical system from traveling in the opposite direction through the viewfinder optical system and reaching the image-pickup device 106 to avoid occurrence of a ghost and flare.

At step S203, the camera system control circuit 135 turns off information display by the in-viewfinder display unit 180. At this point, the eyepiece shutter 163 is already closed and the object cannot be observed with the viewfinder optical system, so that the turn-off of the in-viewfinder display unit 180 can eliminate unnecessary power consumption to prevent battery exhaustion.

Next, at step S204, the camera system control circuit 135 retracts the sub mirror 122 to the lower portion of the mirror box 179 to prepare for the movement of the main mirror 111 to the position in the second optical path state.

Then, at step S205, the camera system control circuit 135 retracts the mirror stoppers 160 and 161 from the movement track of the main mirror 111. After the retraction of the mirror stoppers 160 and 161, at step S206, the camera system control circuit 135 rotates the main mirror driving lever 170 in the counterclockwise direction in FIG. 2 to drive the main mirror 111 to the position in the second optical path state by the biasing force of the spring, not shown, in the mirror driving mechanism (see FIG. 1). As a result, the luminous flux reflected by the main mirror 111 is then directed to the focus detection unit 121.

As described above, in the second optical path state, a slight interval is present between the pins 173 and the first cam surface 170b of the main mirror driving lever 170 and between the pin 174 and the second cam surface 170c of the main mirror driving lever 170, and the main mirror 111 abuts on the mirror stoppers 160 and 161 to be positioned. The position of the reflecting surface of the main mirror 111 in this state corresponds to the position of the reflecting surface of the sub mirror 122 in the first optical path state. Such a structure can set the focus detection area at substantially the same positions in the OVF mode and the EVF mode.

In the second optical path state, as described above, the focus position is not corrected (that is, the driving of the focusing lens 103b to match the image-forming position L2a of the object luminous flux L2 with the position of the image-pickup surface 106a of the image-pickup device 106 is not performed). The image-forming position L2a of the object luminous flux L2 therefore is shifted behind by the shift amount Z1 relative to the position of the image-pickup surface 106a of the image-pickup device 106. However, the relationship between the sizes of the image-pickup device 106 and the display 107 (the magnification of the image) can be set as described above to allow the user to perceive no blur of an image displayed on the display 107.

Next, step S207, the camera system control circuit 135 opens the first curtain of the focal plane shutter 113 to direct the object luminous flux continuously to the image-pickup device 106 to enable display of the image on the display 107. At step S208, it starts display on the display 107.

At step S209, the camera system control circuit 135 performs white balance processing, gamma correction, interpolation calculation processing, and YC processing similarly to step S111 described above on the signal read from the image-pickup device 106. In the mode at step S209, in addition to the abovementioned image processing, the edge enhancement processing is performed on the image. This can reduce perceptible blur in the image which is displayed on the display 107 and is out of focus toward the rear by the shift amount Z1. Only the setting of the relationship between the sizes of the image-pickup device 106 and the display 107 (the magnification of the image) as described above satisfactorily prevents the user from perceiving blur. The edge enhancement processing performed in addition to that setting can increase the perceived resolution of the displayed image to give the user the impression that it is a focused image. However, the edge enhancement processing is not necessarily to be performed.

Next, step S210, the camera system control circuit 135 displays the object image continuously captured by the image-pickup device 106 at a predetermined rate (for example, 1/60 seconds) on the display 107. In this manner, a series of steps in the viewfinder mode switch subroutine is completed.

The visual field area corresponding to the object image displayed on the display 107 in the second optical path state is slightly shifted vertically from the visual field area corresponding to the object image taken in the third optical path state due to the refractive effect of the main mirror 111 upon the object luminous flux L2. In other words, the visual field area in the second optical path state and the visual field area in the third optical path state are vertically shifted, and as a result, a strip-shaped portion of the visual field area is displayed in the second optical path state but is not taken as an image in the third optical path state. Thus, the reproduction processing circuit 134 sets the strip-shaped portion as a non-displayed portion on the display 107 and performs processing not to display the entire visual field area in the second optical path state. This can eliminate any part of the visual field area that can be observed on the display 107 but cannot be taken actually as an image in the EVF mode.

Next, the operation sequence when the OVF mode is set at the abovementioned step S201 will be described.

At step S220, the camera system control circuit 135 turns off the abovementioned edge enhancement processing mode. At step S221, the camera system control circuit 135 powers off the display 107 and stops charge accumulation operation in the image-pickup device 106.

At step S222, the camera system control circuit 135 runs and closes the rear curtain of the focal plane shutter 113, and charges the front curtain and rear curtain driving mechanism to prepare for image taking.

At step S223, the camera system control circuit 135 retracts the mirror stoppers 160 and 161 from the movement track of the main mirror 111 to enable the movement (retraction) of the main mirror 111 to the position corresponding to the third optical path state at the subsequent step.

Next, at step S224, the camera system control circuit 135 rotates the main mirror driving lever 170 in the clockwise direction in FIG. 2 to move the main mirror 111 and the sub mirror 122 from the positions in the first optical path state shown in FIG. 2 to the positions in the third optical path state shown in FIG. 3 through the positions in the second optical path state shown in FIG. 1.

At step S225, the mirror stoppers 160 and 161 are put in predetermined positions for the positioning of the main mirror 111. In this manner, the mirror stoppers 160 and 161 are put after the movement of the main mirror 111 to the position in the third optical path state, so that the disposed mirror stoppers 160 and 161 cannot hit the main mirror 111. The switching between the OVF mode and the EVF mode can be smoothly performed to increase reliability in the mechanism.

Then, at step S226, the camera system control circuit 135 rotates the main mirror driving lever 170 in the counterclockwise direction to set the main mirror 111 from the position in the third optical path state to the position in the first optical path state by the biasing force of the spring, not shown, in the mirror driving mechanism. At this point, the main mirror 111 abuts on the mirror stoppers 160 and 161 to be positioned.

At step S227, the camera system control circuit 135 opens the eyepiece shutter 163. This allows object observation with the viewfinder optical system.

Next, at step S228, the camera system control circuit 135 determines whether a manual focus mode or an auto-focus mode is selected by a focus mode switch, not shown. If the auto-focus mode is selected, the flow proceeds to step S229, or to step S207 if the manual focus mode is selected. In the manual focus mode, since focus detection by the focus detection unit 121 is not required and the user can see the degree of blur of the background more accurately on the display 107 than with the viewfinder optical system, the flow proceeds to step S207 to perform real-time display on the display 107.

At step S229, the camera system control circuit 135 sets the sub mirror 122 to the position in the first optical path state for directing the object luminous flux to the focus detection unit 121.

Next, at step S230, the camera system control circuit 135 starts information display with the in-viewfinder display unit 180 to end a series of steps in the viewfinder mode switch subroutine.

According to Embodiment 1, any problem of defocus does not occur in both of the second optical path state and third optical path state, and the time lag can be reduced when the transition is made from the second optical path state to the third optical path state to take images. In addition, in Embodiment 1, fast focusing can be performed with the phase difference detection method while the user monitors the object on the display 107.

Embodiment 2

Figure 11:
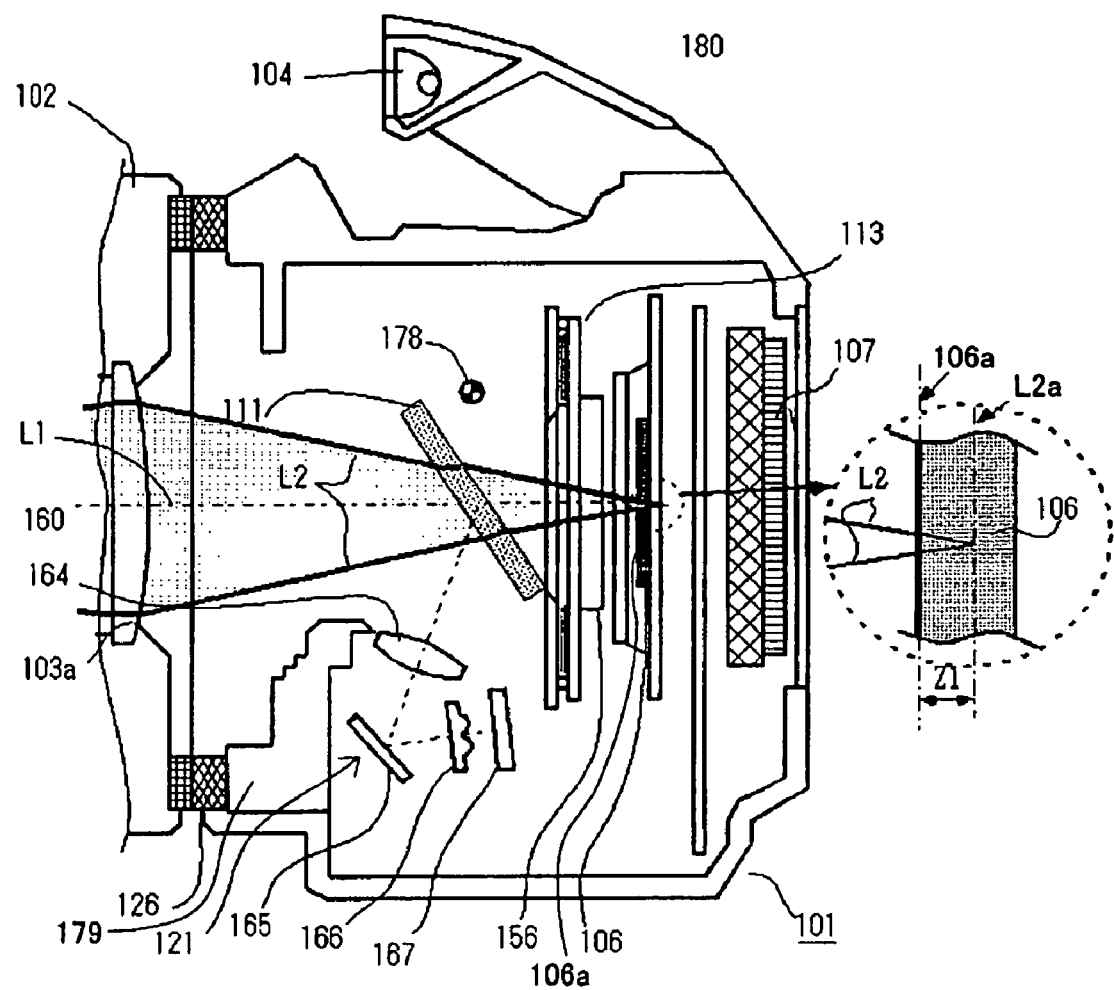
FIG. 11 is a section view of an image-taking apparatus (in a second optical path state) which is Embodiment 2 of the present invention.
Figure 12:
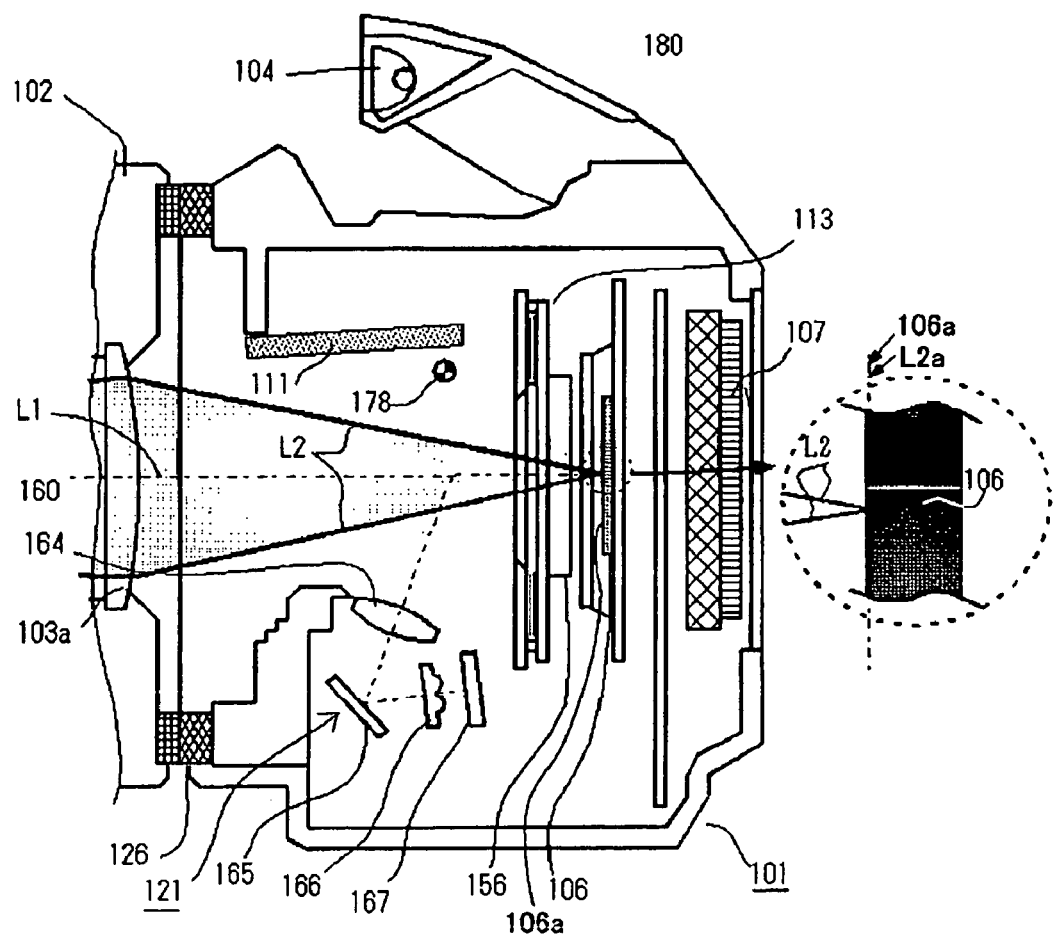
FIG. 12 is a section view of the image-taking apparatus (in a third optical path state) of Embodiment 2.

FIGS. 11 and 12 show the structure of an image-taking apparatus which is Embodiment 2 of the present invention. The image-taking apparatus of Embodiment 2 differs from the image-taking apparatus of Embodiment 1 in that the former does not have a viewfinder optical system. Thus, an optical path splitting system is formed only of a main mirror 111 and has no sub mirror. The optical path splitting system switches between a second optical path state (a first state) as shown in FIG. 11 in which object luminous flux L2 is split into a light component toward a focus detection unit 121 and a light component toward an image-pickup device 106 and a third optical path state (a second state) as shown in FIG. 12 in which the main mirror 111 is retracted from an image-taking optical path.

In Embodiment 2, components identical to those in Embodiment 1 are designated with the same reference numerals as those in FIG. 1 to 3, and the description thereof will be omitted.

The main mirror 111 is held by a main mirror receiving plate, not shown. The main mirror receiving plate is supported rotatably about an axis 178 provided for a mirror box 179. Thus, the main mirror receiving plate and the main mirror 111 are integrally rotated about the axis 178 relative to the mirror box 179. The main mirror receiving plate is biased toward the counterclockwise direction in FIGS. 11 and 12 by a torsion spring, not shown. The main mirror receiving plate abuts on a mirror stopper, not shown, to be held in the second optical path state shown in FIG. 11. In the second optical path state, part of the object luminous flux L2 emerging from an image-forming optical system 103 and reflected by the main mirror 111 is then directed to the focus detection unit 121, while the remaining luminous flux transmitted through the main mirror 111 is then directed to the image-pickup device 106.

When the transition is made from the second optical path state shown in FIG. 11 to the third optical path state shown in FIG. 12, the main mirror receiving plate and the main mirror 111 are driven in the clockwise direction in FIGS. 11 and 12 by a mirror driving mechanism formed of an electromagnetic motor and a gear train, not shown. In the third optical path state, the main mirror receiving plate abuts on the mirror stopper, not shown, to be held.

On the other hand, when the transition is made from the third optical path state to the second optical path state, the driving of the mirror driving mechanism is cancelled to cause the biasing force of the torsion spring to rotate the main mirror receiving plate and the main mirror 111 about the axis 178 in the counterclockwise direction in FIGS. 11 and 12. The main mirror receiving plate abuts on the mirror stopper to complete the transition to the second optical path state.

Since the luminous flux is directed to the focus detection unit 121 in the second optical path state in Embodiment 2 similarly to Embodiment 1, fast focusing can be performed with the phase difference detection method while a user monitors an object image on a display 107.

The object luminous flux L2 emerging from the image-forming optical system 103 and transmitted through the main mirror 111 then reaches the image-pickup device 106 in the second optical path state as shown in FIG. 11 in Embodiment 2 similarly to Embodiment 1. A camera system control circuit, not shown, drives a focusing lens in the image-forming optical system 103 to perform focusing such that an image-forming position L2a of the object luminous flux L2 matches the position of the image-pickup surface 106a of the image-pickup device 106 in the third optical path state. In other words, the image-forming position L2a is set behind the image-pickup surface 106a by a shift amount Z1 corresponding to a change in optical path length due to the main mirror 111 put into the image-taking optical path.

Thus, immediately after the transition from the second optical path state to the third optical path state, the image-forming position L2a of the object luminous flux L2 matches the position of the image-pickup surface 106a of the image-pickup device 106 without driving the focusing lens. Thus, the start of image-taking operation is not limited by the time period necessary for the driving of the focusing lens, so that the release time lag can be reduced.

In Embodiment 2, similarly to Embodiment 1, the relationship between the sizes of the image-pickup device 106 and the display 107 (the magnification of the image) can be set to satisfy the expression (8) described in Embodiment 1 to allow the user to perceive almost no blur of an image displayed on the display 107 in the second optical path state.

Similarly to Embodiment 1, in the second optical path state, edge enhancement processing may be performed on the image produced from the signal read from the image-pickup device 106 to reduce perceivable blur of the image to give the user the impression that it is a focused image.

It should be noted that the value used in the expression (8) in Embodiment 1 as the resolution of human eyes is only illustrative for calculating the upper limit (the predetermined value) of the magnification c in the display relative to the image-pickup device. The resolution of human eyes actually depends on various conditions such as vision, the observation distance, and brightness in the surroundings. There is the theory that a man having 1.0 vision in both eyes has a resolution of one minute (60 seconds) The present invention is not limited to the upper limit used in Embodiment 1, and it is possible to use a typical resolution under standard conditions or a resolution under special conditions. In any case, any upper limit calculated by using the resolution of human eyes as an element may be used.

The structure and operation of the optical path splitting systems are not limited to those described in Embodiments 1 and 2, and any structure and operation may be used as long as they achieve the function similar to those in Embodiments 1 and 2.

Furthermore, the present invention is not limited to these preferred embodiments and various variations and modifications may be made without departing from the scope of the present invention.

This application claims a foreign priority benefit based on Japanese Patent Application No. 2005-163527, filed on Jun. 3, 2005, which is hereby incorporated by reference herein in its entirety as if fully set forth herein.

What is claimed is:

1. An image-taking apparatus comprising: an image-pickup device which photoelectrically converts an object image formed by an image-taking lens; a display unit which displays an image produced on the basis of a signal from the image-pickup device; a focus detection unit which detects a focus state of the image-taking lens by using light from the image-taking lens; an optical path splitting unit which is switchable between a first state in which the optical path splitting unit is disposed in an optical path from the image-taking lens to the image-pickup device and a second state in which the optical path splitting unit is retracted from the optical path, the optical path splitting unit transmitting part of the light from the image-taking lens toward the image-pickup device and reflecting the remaining part of the light toward the focus detection unit in the first state, an optical path length to a light-receiving surface of the image-taking apparatus in the first state and an optical path length to the light-receiving surface of the image-taking apparatus in the second state being different from each other; and a control unit which performs focus control of the image-taking lens based on the detection result of the focus detection unit, the control unit does not perform the focus control when the optical path splitting unit is made from the first state to the second state, wherein, in the first state of the optical path splitting unit, the control unit performs the focus control such that an image-forming position of the light by the image-taking lens matches the light-receiving surface of the image-pickup device using the optical path length to a light-receiving surface of the image-taking apparatus in the second state of the optical path splitting unit.

2. The image-taking apparatus according to claim 1, further comprising a display control unit which controls the display unit,
wherein, in the first state of the optical path splitting unit, the display control unit controls the display unit such that the image is displayed thereon at a magnification relative to the object image formed on the image-pickup device, the magnification being smaller than a predetermined value set on the basis of a resolution of human eyes.

3. The image-taking apparatus according to claim 1, further comprising a display control unit which controls the display unit,
wherein, in the first state of the optical path splitting unit, the display control unit controls the display unit such that the image is displayed thereon at a magnification relative to the object image formed on the image-pickup device, the magnification being smaller than 3.8.

4. The image-taking apparatus according to claim 3, further comprising a viewfinder optical system which allows optical observation of the object image formed by the image-taking lens,
wherein the optical path splitting unit is switchable to a third state in which the optical path splitting unit is disposed in the optical path to reflect part of the light from the image-taking lens toward the viewfinder optical system and to reflect the remaining part of the light toward the focus detection unit.

5. The image-taking apparatus according to claim 1, further comprising an image processing unit which performs image processing on a signal from the image-pickup device to produce an image,
wherein, in the first state of the optical path splitting unit, the image processing unit performs edge enhancement processing on the image, and the display unit displays the image after the edge enhancement processing by the image processing unit.

6. The image-taking apparatus according to claim 5, further comprising a viewfinder optical system which allows optical observation of the object image formed by the image-taking lens,
wherein the optical path splitting unit is switchable to a third state in which the optical path splitting unit is disposed in the optical path to reflect part of the light from the image-taking lens toward the viewfinder optical system and to reflect the remaining part of light toward the focus detection unit.

7. A method of controlling an image-taking apparatus which comprises:
an image-pickup device which photoelectrically converts an object image formed by an image-taking lens;
an image processing unit which performs image processing on a signal from the image-pickup device to produce an image;
a display unit which displays the produced image;
a focus detection unit which detects a focus state of the image-taking lens by using light from the image-taking lens;
an optical path splitting unit which is switchable between a first state in which the optical path splitting unit is disposed in an optical path from the image-taking lens to the image-pickup device and a second state in which the optical path splitting unit is retracted from the optical path, the optical path splitting unit transmitting part of the light from the image-taking lens toward the image-pickup device and reflecting the remaining part of the light toward the focus detection unit in the first state; and
a control unit which performs focus control of the image-taking lens based on the detection result of the focus detection unit,
the method comprising the steps of:
switching the optical path splitting unit to the first state, an optical path length to a light-receiving surface of said the image-taking apparatus in the first state and an optical path length to the light-receiving surface of said the image-taking apparatus in the second state being different from each other; and
performing the focus control by the control unit in the first state of the optical path splitting unit such that an image-forming position of the light by the image-taking lens matches the light-receiving surface of the image-pickup device using the optical path length to a light-receiving surface of the image-taking apparatus in the second state of the optical path splitting unit and, the optical path splitting unit is made from the first state to the second state, the control unit does not perform the focus control.

8. The method of controlling an image-taking apparatus according to claim 7, further comprising the step of controlling display on the display unit in the first state of the optical path splitting unit such that the image is displayed on the display unit at a magnification relative to the object image formed on the image-pickup device, the magnification being smaller than a predetermined value set on the basis of a resolution of human eyes.

9. The method of controlling an image-taking apparatus according to claim 7, further comprising the step of performing image processing of edge enhancement on the image by the image processing unit in the first state of the optical path splitting unit.

* * * * *